INVENTORS
A. H. BALLARD
B. R. BOYMEL

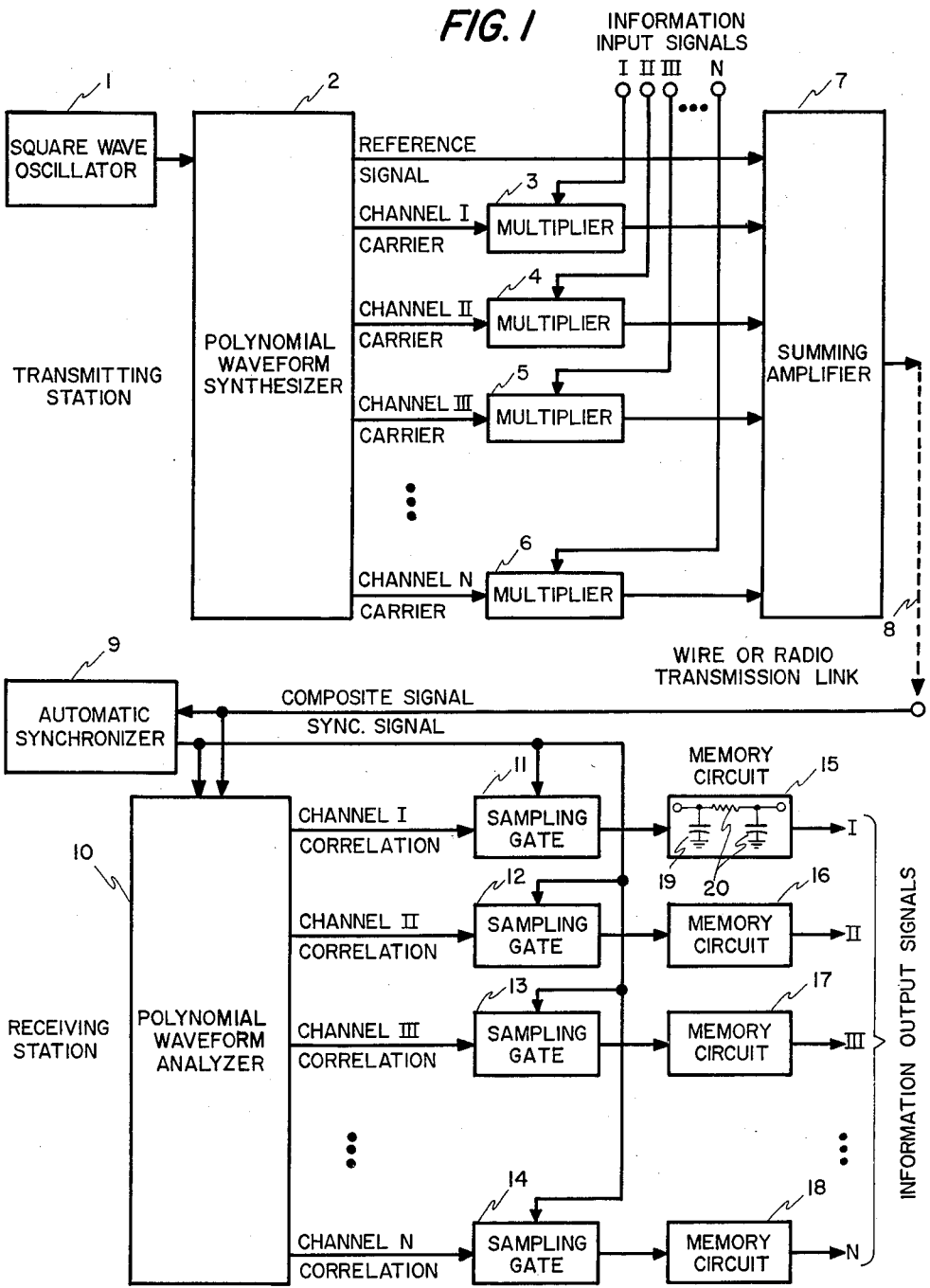

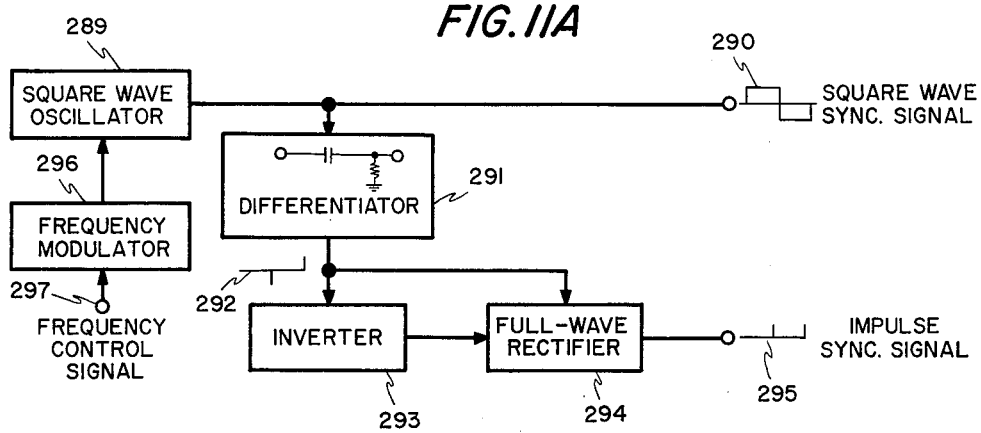
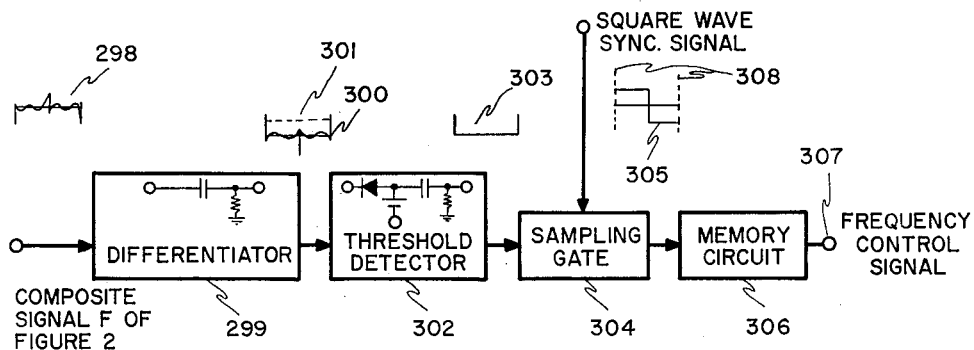
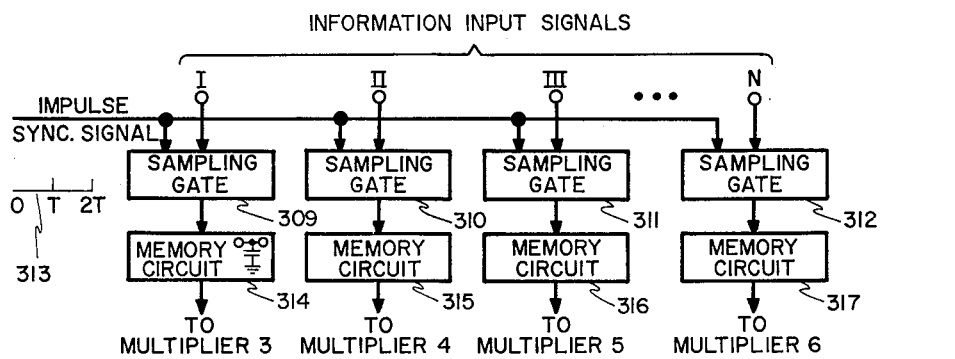

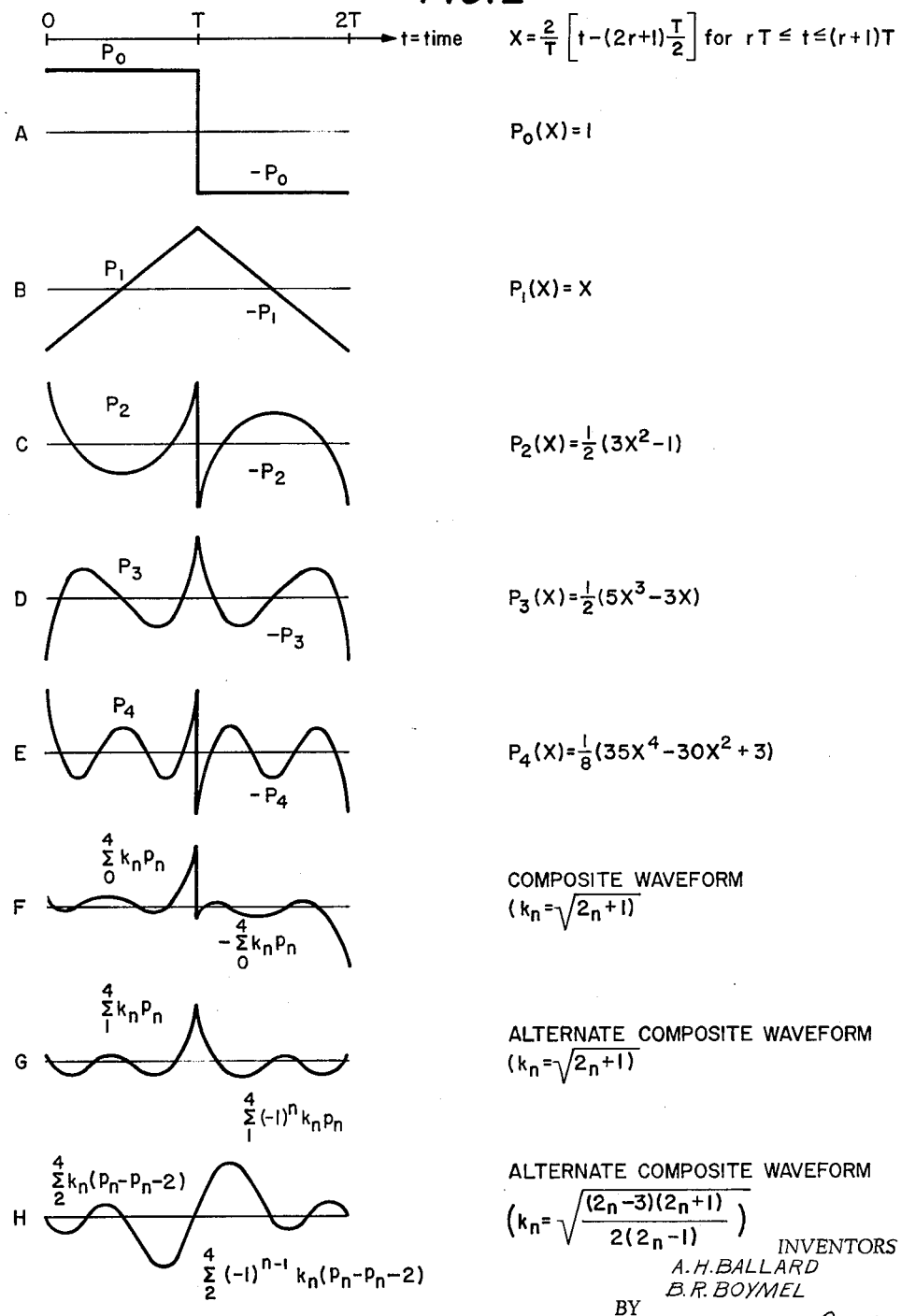

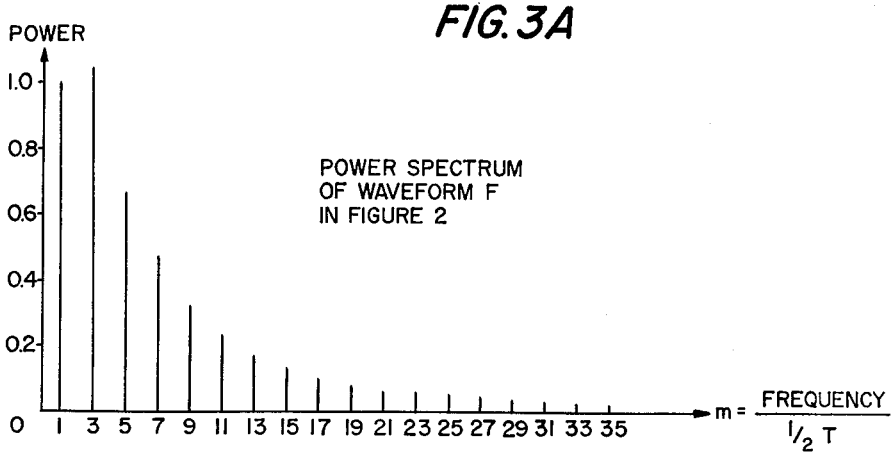
FIG. 3A — POWER SPECTRUM OF WAVEFORM F IN FIGURE 2
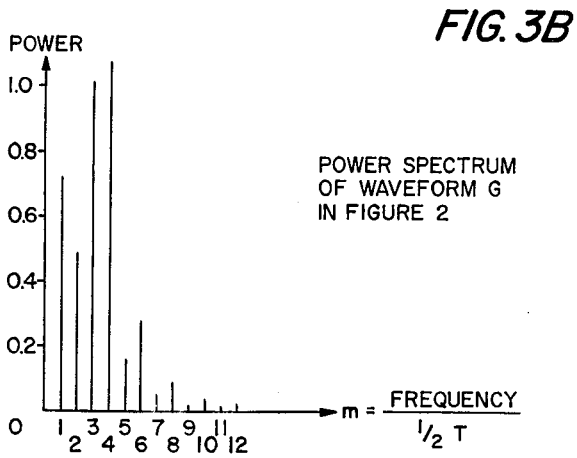
FIG. 3B — POWER SPECTRUM OF WAVEFORM G IN FIGURE 2
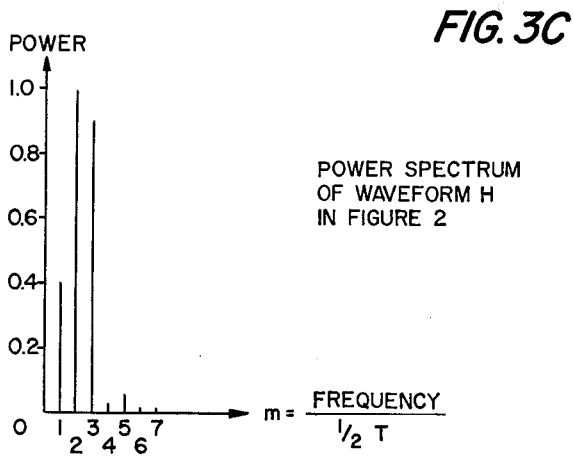
FIG. 3C — POWER SPECTRUM OF WAVEFORM H IN FIGURE 2
INVENTORS
A. H. BALLARD
B. R. BOYMEL

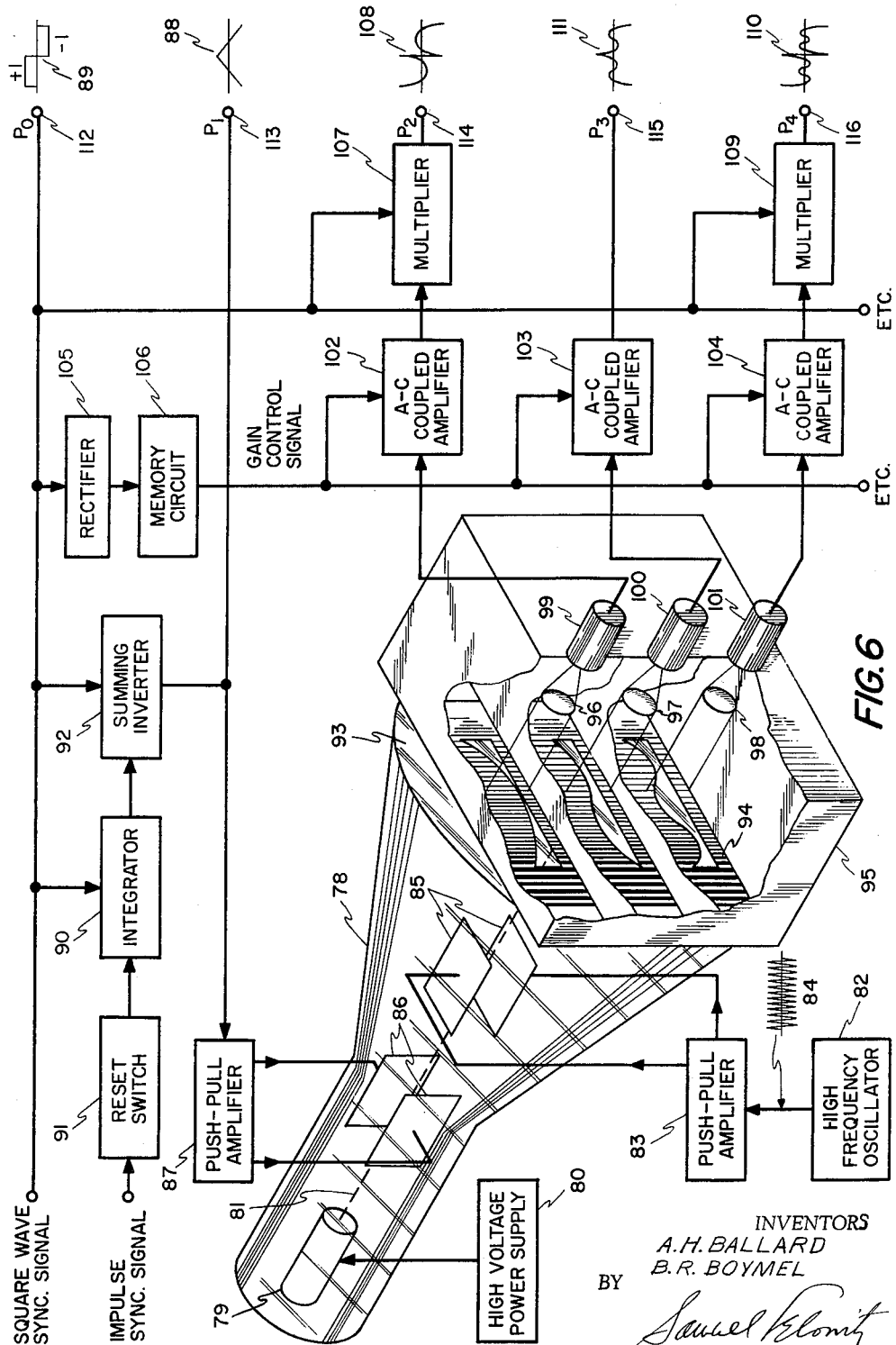

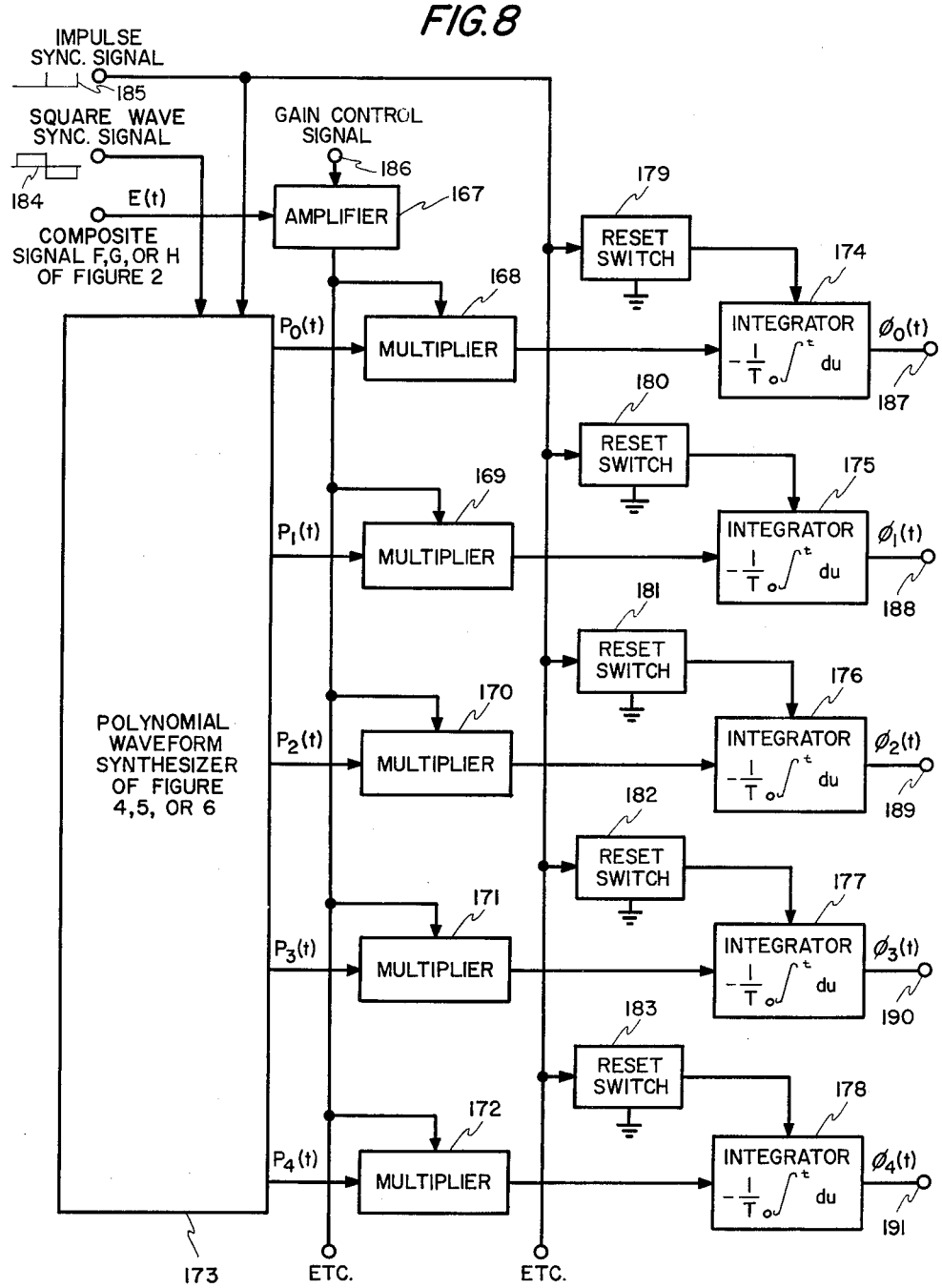

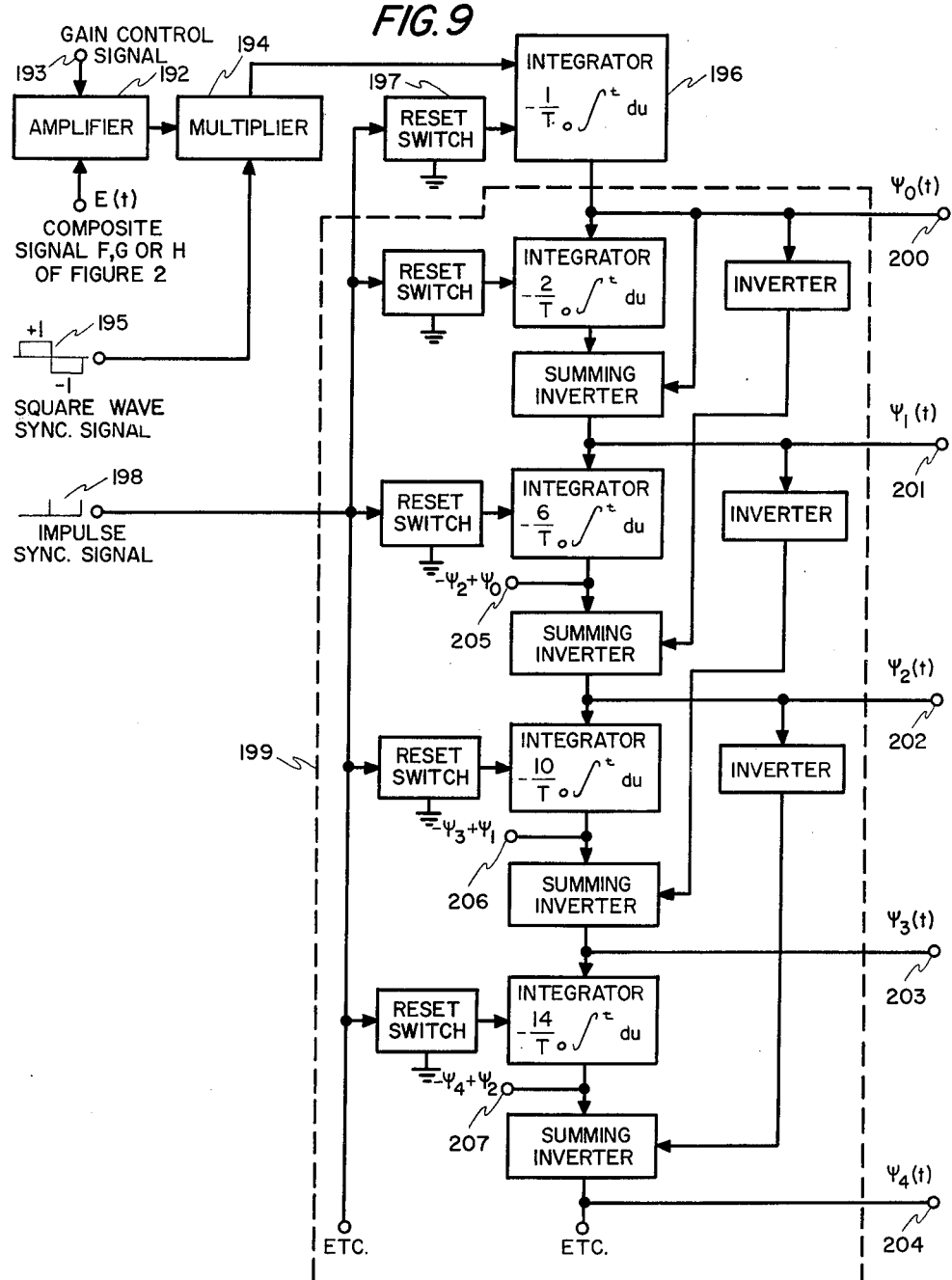

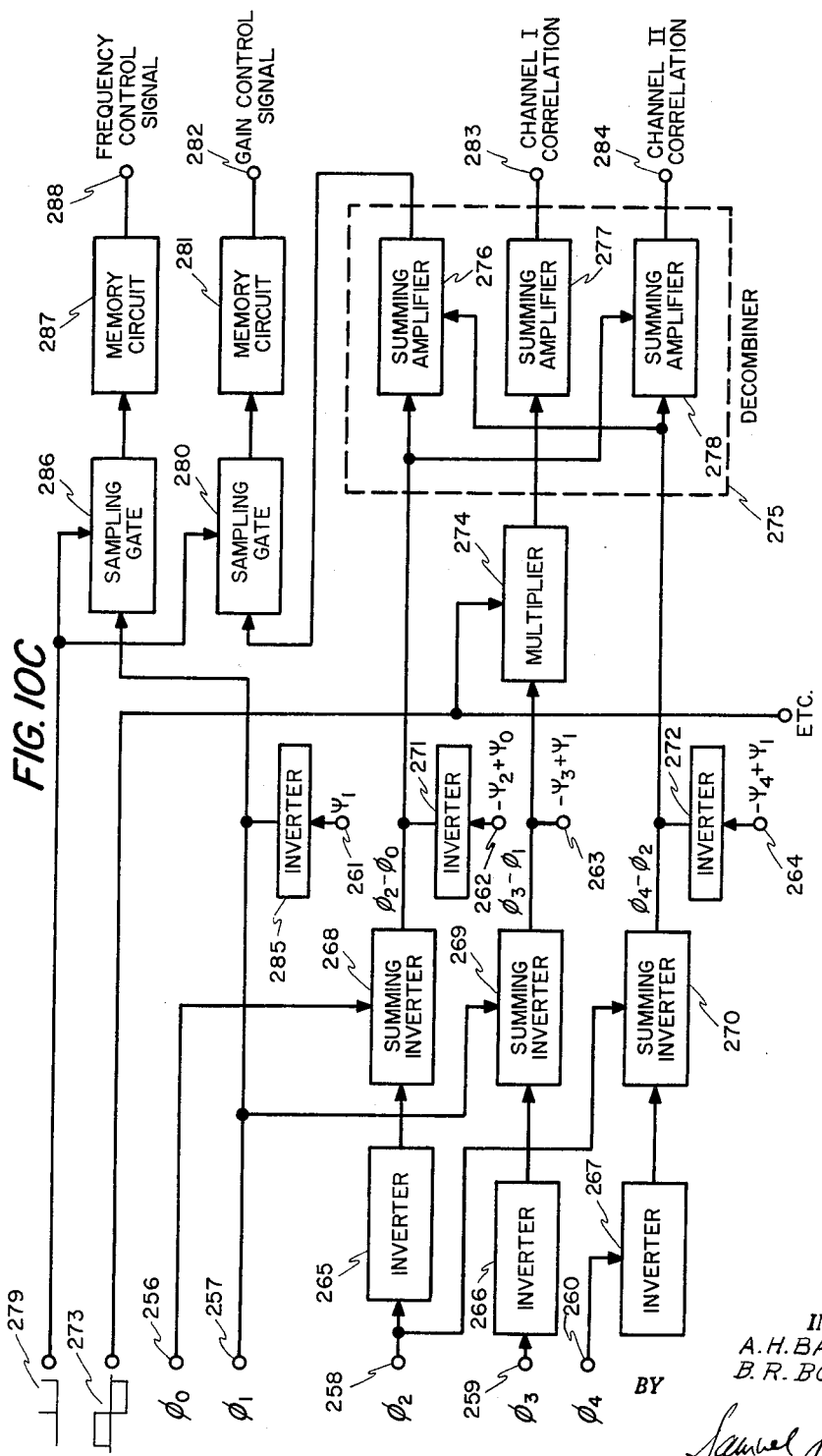

United States Patent Office 3,204,034
Patented Aug. 31, 1965

3,204,034
ORTHOGONAL POLYNOMIAL MULTIPLEX TRANSMISSION SYSTEMS
Arthur H. Ballard, 2001 N. Adams St., Arlington 1, Va., and Bernard R. Boymel, 5730 26th St. NW., Washington 15, D.C.
Filed Apr. 26, 1962, Ser. No. 190,294
9 Claims. (Cl. 179—15)

This invention relates to systems for transmitting and receiving multiple channels of information signals over a single electrical or electromagnetic link. While not limited thereto, the information signals may consist of voice, music, telegraphy, telephoto, telemetering, remote control, or other signals.

Previously described multiplex transmission systems have employed either sine wave carriers separated in frequency, rectangular pulse carriers separated in time, or combinations thereof, to carry various information channels on a single transmission link in a form which permits the channels to be separated again without mutual interference. In the case of sine wave carriers, information has been conveyed by modulating the amplitude, frequency, or phase of the basic sine waves. In the case of rectangular pulse carriers, information has been conveyed by modulating the amplitude, duration, position, or group coding of the carrier pulses.

The use of sine wave carriers has the disadvantage that either a separate oscillator must be provided for each channel, or extremely complex equipment must be employed to generate harmonically related sine waves from a single oscillator. A further disadvantage is the inefficient utilization of bandwidth associated with sine wave carriers which results from the excessive frequency spacing between carriers needed in order that they can be separated without interference by resonant filter networks of practical design. Still another disadvantage is that the filter networks needed for channel separation often require the use of bulky components such as iron-core inductors, which results in an equipment of excessive size and weight.

The use of rectangular pulse carriers, on the other hand, has the disadvantage that complicated and frequently unreliable synchronizing equipment is needed to combine and separate the carrier pulses at proper instants of time. Related to this disadvantage is the ever-present hazard that improper synchronization will result in cross-connection of channels. A further disadvantage of pulse carrier systems is their lack of flexibility in increasing or decreasing the number of channels without major equipment changes.

The multiplex transmission systems of this invention obviate these limitations by the use of orthogonal polynomial signals. The term orthogonal is defined herein as the mutual property of two time-dependent waveforms, $P_n(t)$ and $P_m(t)$, such that their product averaged over a fixed time duration T, is equal to zero. That is to say, the two waveforms are orthogonal if:

$$\frac{1}{T}\int_0^T P_n(t)P_m(t)dt=0, \ n \neq m$$

There are many sets of waveforms, all pairs of which satisfy the condition for orthogonality. The waveforms of concern to this invention are those which are polynomial functions of time. That is to say, all waveforms can be expressed as finite sums of algebraic terms, each term being a power of $t$, the independent time variable. A polynomial waveform of order $n$ can be defined as:

$$P_n(t)=\sum_{i=0}^{n} \alpha_i t^i$$

where the quantities $\alpha_i$ are fixed numerical coefficients.

The set of polynomial waveforms satisfying the orthogonality condition is unique except for arbitrary constant multiplying factors. These polynomials were, in fact, discovered by the French mathematician Legendre in the late eighteenth century, and are often referred to as Legendre polynomials. A theoretical discussion of these polynomials can be found, for example, in A Course of Modern Analysis by E. T. Wittaker and G. N. Watson, Cambridge University Press, 4th edition, reprinted 1958, pages 302–336.

It is one object of the present invention to provide a new class of multiplex transmission systems employing orthogonal polynomial waveforms as carrier signals, in order that many channels of electrical information can be combined on a single transmission link and separated again without mutual interference.

Another object of the present invention is to provide a class of multiplex transmission systems in which all channels share the same frequency spectrum and time duration in an efficient manner.

A further object of the present invention is to provide a class of multiplex transmission systems in which all channels provide equal amounts or rejection to random internal or external noise, such rejection being considerably higher than that exhibited by previous transmission systems.

Still another object of the present invention is to provide a class of multiplex transmission systems in which all channels are readily adaptable to proportional analog, as well as discrete digital modulation, the analog modulation being automatically calibrated, and being capable of either positive or negative excursions about a zero level, the zero level being automatically produced at the receiver in the event of signal interuption.

A still further object of the present invention is to provide a class of multiplex transmission systems which are readily adaptable to small, lightweight, reliable construction using solid-state components such as transistors, diodes, resistors, and capacitors.

Still another object of the present invention is to provide a class of multiplex transmission systems in which all channels are synchronized by a single oscillator, and in which the receiver is automatically and simply synchronized to the transmitter without danger of channel cross-connection.

A still further object of the present invention is to provide a class of multiplex transmission systems in which the number of channels can be easily increased or decreased by adding or subtracting small amounts of equipment with little or no effect on the other channels.

Other objects and many of the attendant advantages of this invention will be readily appreciated as the same becomes better understood by reference to the following detailed description when considered in connection with the accompanying drawings, wherein:

FIGURE 1 is a block diagram illustrating a generalized embodiment of the class of multiplex transmission systems comprising the invention.

FIGURE 1A illustrates a modification of the information input circuits which may be used if bandwidth conservation is important.

FIGURE 2 illustrates the waveforms of the first five orthogonal polynomials, as well as three examples of composite transmission signals derived from the polynomial waveforms.

FIGURES 3A, 3B, and 3C are graphs of power spectrum vs. frequency for the composite signals of FIGURE 2.

Figure 4:
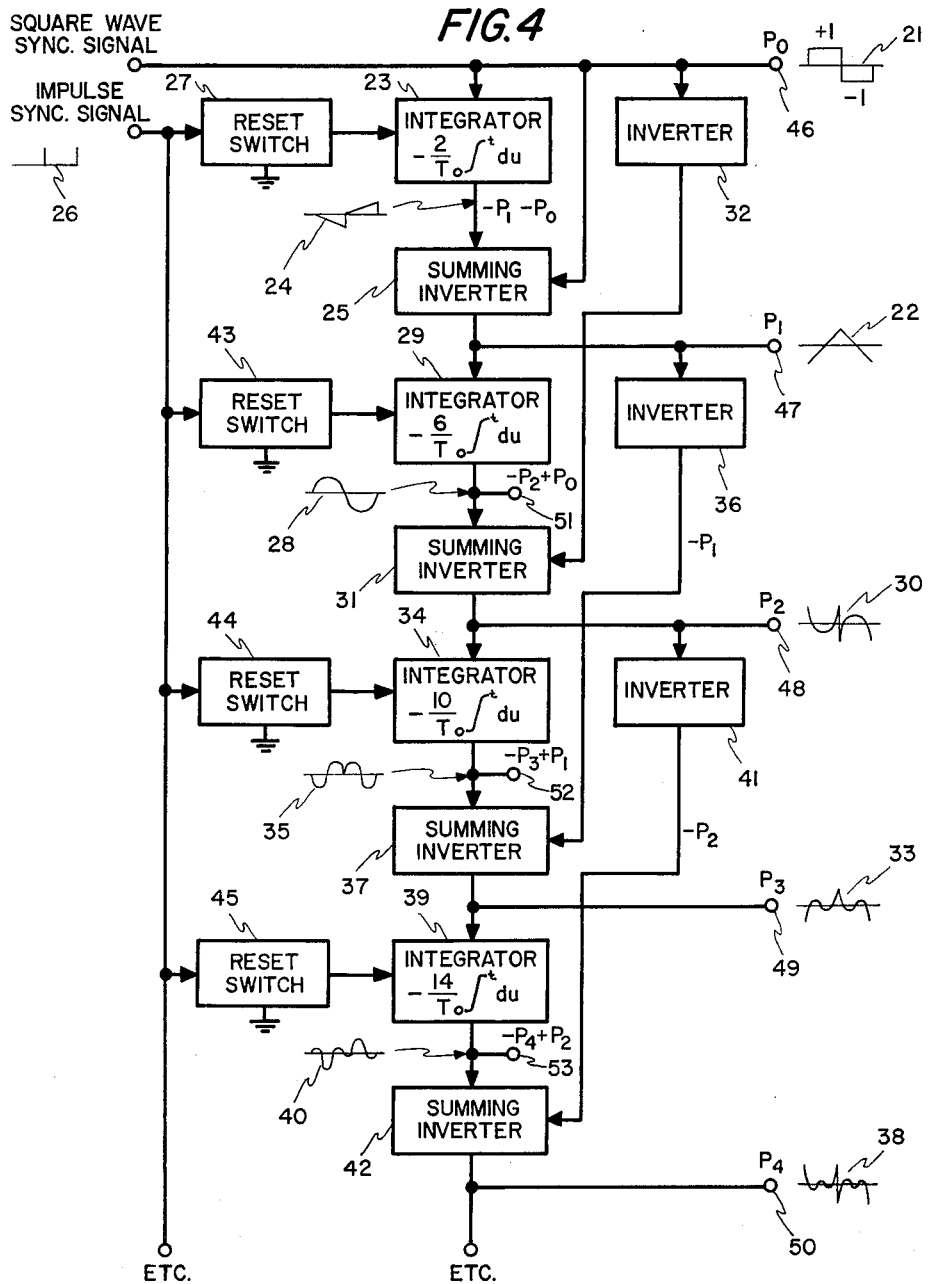

FIGURE 4 is a block diagram of an electronic polynomial waveform synthesizer using cascaded integrator circuits.

Figure 5:
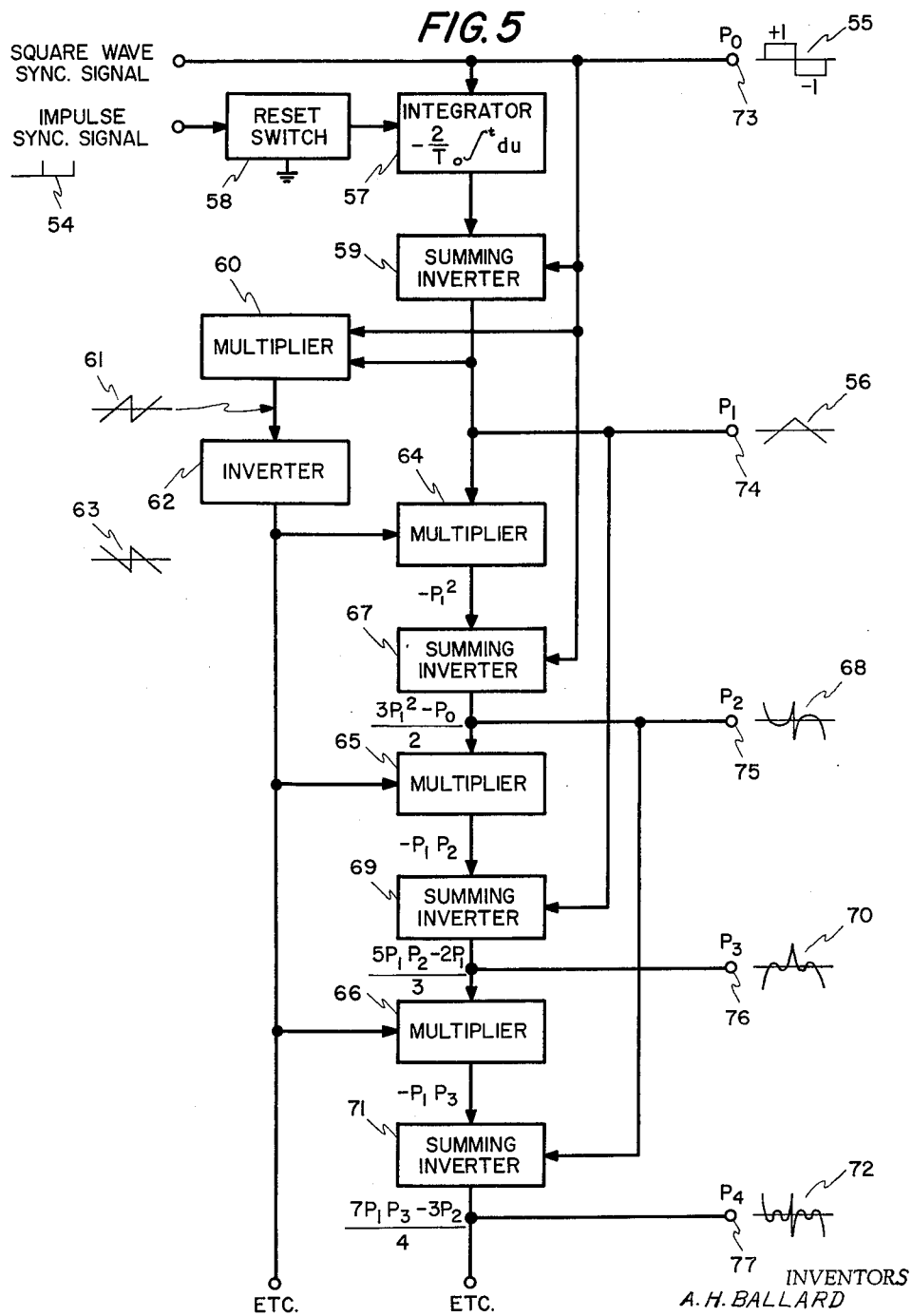

FIGURE 5 is a block diagram of an electronic polynomial waveform synthesizer using cascaded multiplier circuits.

FIGURE 6 illustrates a polynomial waveform synthesizer using photoelectric techniques.

Figure 7A:
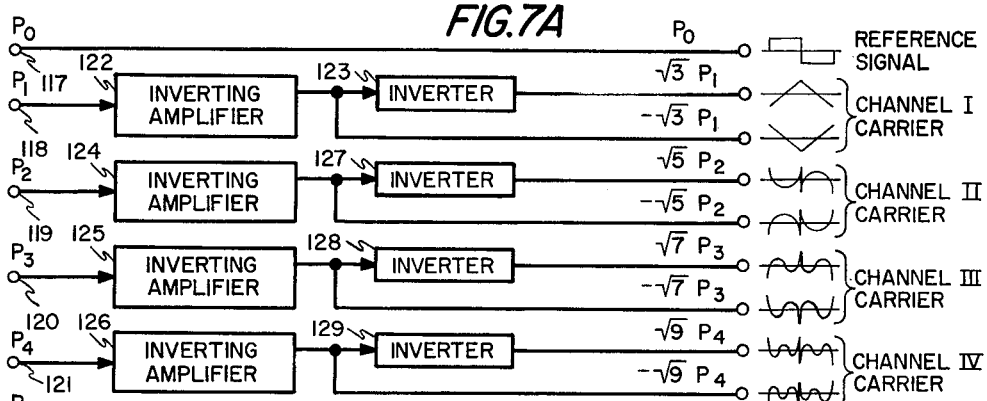
Figure 7B:
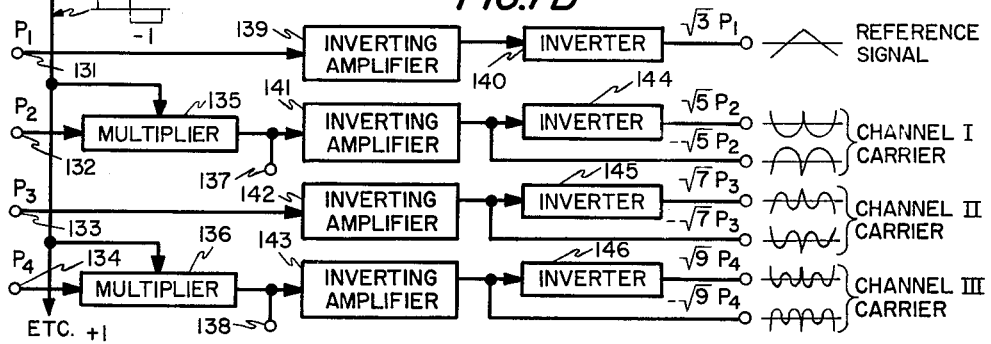
Figure 7C:
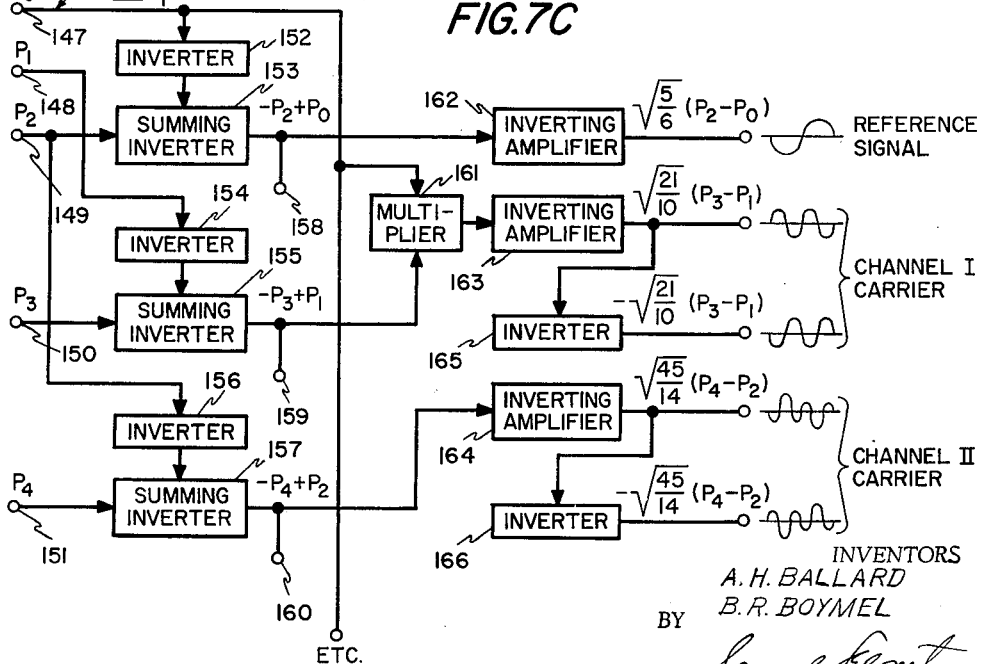

FIGURES 7A, 7B, and 7C show attachments for the synthesizer of FIGURES 4, 5, or 6 needed to obtain each of the composite signals of FIGURE 2.

FIGURE 8 is a block diagram of a polynomial waveform analyzer using the synthesizer of FIGURE 4, 5, or 6 in combination with a parallel bank of multiplier-integrator circuits.

FIGURE 9 is a block diagram of an electronic polynomial waveform analyzer using cascaded integrator circuits.

Figure 10A:
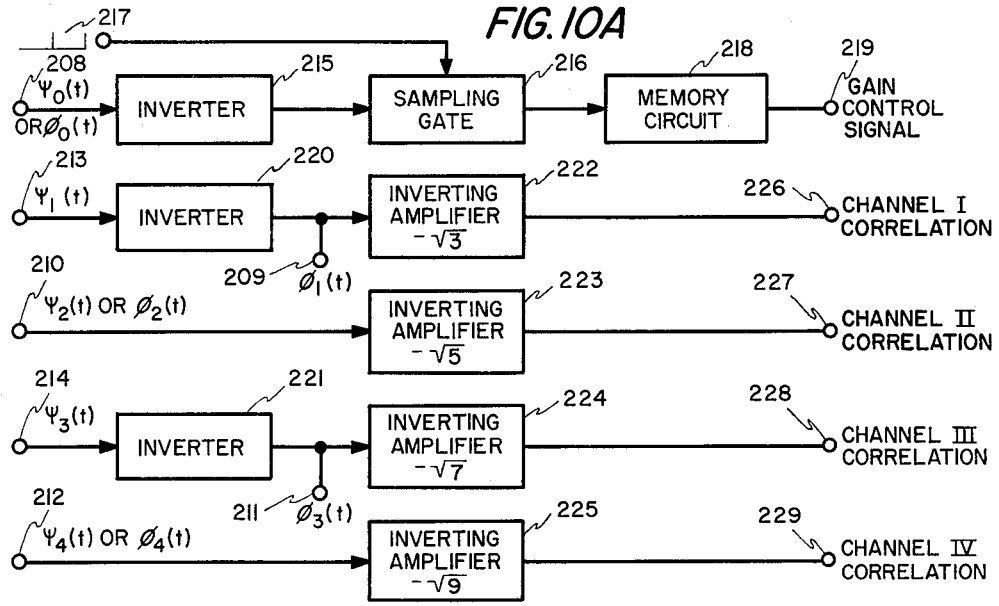
Figure 10B:
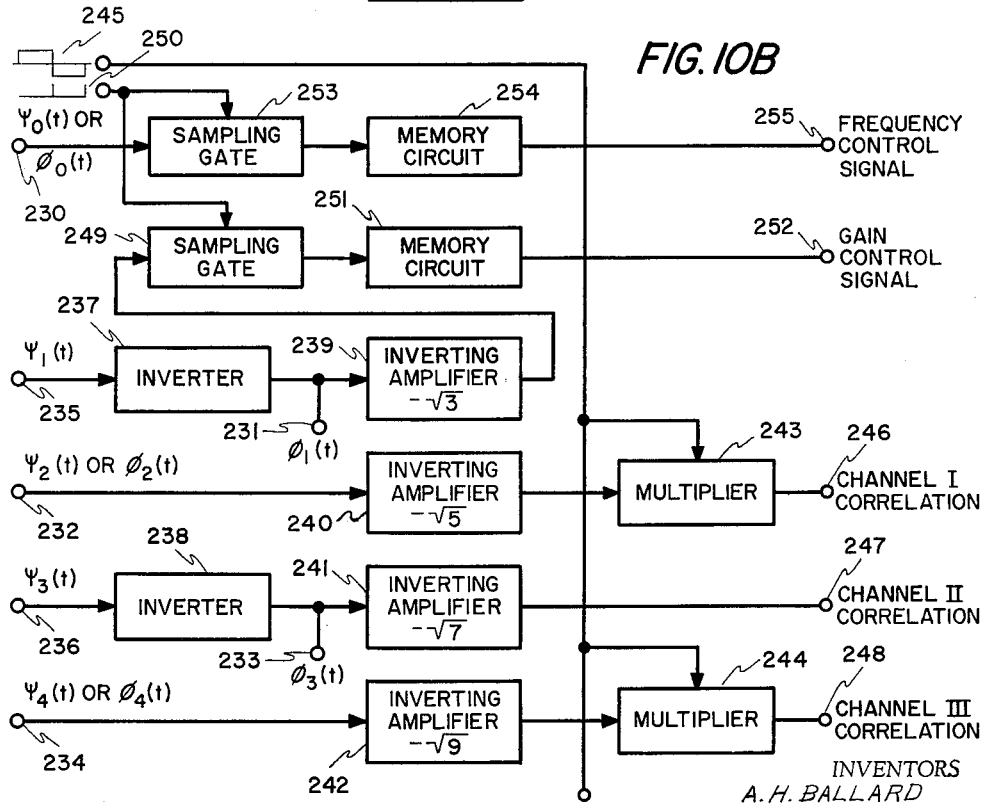

FIGURES 10A, 10B, and 10C show the attachments needed with the analyzer of FIGURES 8 or 9 for use with each of the composite waveforms of FIGURE 2.

FIGURE 11A is a block diagram illustrating one method of automatically producing suitable synchronizing signals at the receiving station.

FIGURE 11B is a block diagram illustrating one method of automatically deriving a frequency control signal at the receiving station from the composite signal F of FIGURE 2.

Overall operation of the multiplex transmission systems of this invention can be understood by referring to the block diagram of FIGURE 1. The equipment comprising the invention is divided into two parts—one part being located at the transmitting station, and the other part being located at the receiving station. The two stations may be remote from each other, the separation distance not being critical provided that they are connected by wire, radio, or other link capable of transmitting electrical signals. Either station, or both stations, may be located in moving vehicles if desired.

At the transmitting station, the carrier signals for each channel, as well as a reference signal, are derived from the output signal of a square wave oscillator 1 by means of a polynomial waveform synthesizer 2. The square wave oscillator 1 may be a conventional astable multivibrator such as described in the textbook Pulse and Digital Circuits by J. Millman and H. Taub, McGraw-Hill, 1956, at pages 199–201. The oscillator frequency is made at least equal to, and preferably greater than, the maximum bandwidth of the information signals to be transmitted. In typical applications of the invention, the square wave frequency might lie in the range from 10 cycles per second to 10 kilocycles per second, although these limits are not restrictive. The polynomial waveform synthesizer 2 can take various forms, several examples of which will be described later.

The carrier channels are labeled as I, II, III . . . N in FIGURE 1 in order to make it very clear that the number of channels is not restricted; there being no fundamental limit to the number of channels other than the bandwidth available for transmission.

The carrier signals produced for each channel by the polynomial waveform synthesizer 2 are modulated with their corresponding information input signals by means of the multipliers 3, 4, 5, and 6. The information input signals are allowed to vary, in normalized form, anywhere within the range from −1 to +1. In typical applications of the invention, full scale information of +1 might represent a voltage in the range from 1 to 10 volts; although these limits are not restrictive. The multipliers 3, 4, 5, and 6 are of the four-quadrant type; that is they are capable of accepting either positive or negative signals at both input terminals and generating a product signal of correct algebraic polarity. In their simplest form, the multipliers 3, 4, 5, and 6 may consist of grounded-center-tap potentiometers, the carrier signals being applied with opposite polarity to the two ends of the potentiometers, and the information input signals being applied in the form of mechanical shaft rotations. Alternatively, the multipliers 3, 4, 5, and 6 may be entirely electronic devices as described for example in the paper A Transistorized Four Quadrant Time Division Multiplier With an Accuracy of 0.1 Percent by H. Schmid, IRE Transactions on Electronic Computers, March 1958, pages 41–47. The type of modulation produced by four-quadrant multiplication is equivalent to double-sideband, suppressed-carrier, amplitude modulation.

The modulated carriers for each channel, as well as an unmodulated reference signal are applied to a summing amplifier 7 which algebraically adds all signals together in a linear manner. The summing amplifier 7 may consist for example of a conventional operational amplifier and summing resistor network as described in the textbook Electronic Analog Computers, G. A. Korn and T. M. Korn, McGraw-Hill, 1952, at pages 12–14.

The composite signal produced by the summing amplifier 7 is transmitted over a wire or radio transmission link 8, which is not a part of this invention, to the receiving station. The transmission link 8 may possibly include additional modulation and demodulation equipment for placing the composite signal in an advantageous portion of the radio-frequency spectrum. The principal requirements on the transmission link 8 are that it be capable of producing a signal gain of approximately unity, that the noise level not be unreasonably high, and that the bandwidth be at least equal to the number of channels times the frequency of the square wave oscillator 1.

At the receiving station, the composite signal is applied to an automatic synchronizer 9, to be described later in detail in conjunction with FIGURE 11A. The purpose of this synchronizer is to detect automatically the fundamental frequency and phase of the square wave oscillator signal employed at the transmitting station and to generate noise-free synchronizing signals of the same frequency and phase for use at the receiving station.

The composite signal is also applied to a polynomial waveform analyzer 10, several possible forms of which will be described later in conjunction with FIGURES 8–10. The function of the polynomial waveform analyzer 10 is to compute, for each half cycle of the square wave synchronizing signal, what value of information input signal was used to modulate each carrier. As will be shown, the computations performed are equivalent to correlating the composite signal with the carrier waveform for each channel. From the teachings of optimum signal detection in the presence of noise, as set forth for example in Random Signals and Noise, W. B. Davenport and W. L. Root, McGraw-Hill, 1958, pages 343–345, it is known that correlation is the best process for measuring signal amplitudes with maximum rejection of noise.

At the end of each half cycle of the square wave synchronizing signal, the results of the correlation computation for each channel are passed through the sampling gates 11, 12, 13 and 14, and stored in the memory circuits 15, 16, 17, and 18. The sampling gates 11, 12, 13, and 14 may be conventional six-diode gates as described, for example, in Pulse and Digital Circuits, J. Millman and H. Taub, McGraw-Hill, 1956 at pages 445–447. Memory circuit 15 contains a memory capacitor 19, whose function is to store each sampled correlation voltage for channel I from one synchronizing interval to the next, and a lowpass filter 20, whose function is to produce an outward waveform which passes smoothly through the sequence of stored voltages. Memory circuits 16, 17, and 18 contain similar networks which perform the same functions for the other channels. Output signals taken from the memory circuits 15, 16, 17, and 18 represent the original information signals applied at the transmitting station.

In those applications where bandwidth conservation is important, the additional circuits shown in FIGURE 1A may be included in the transmitter equipment. It is essential that each information input signal remain constant, or very nearly constant, during each transmission interval in order that the carrier waveforms retain their orthogonal properties. This requirement is met if the frequency of the square wave synchronizing signal is large compared to the bandwidth of the information signals, but such a choice for the synchronizing frequency may be overly wasteful of bandwidth.

The well-known Nyquist Sampling Theorem teaches that any signal limited in bandwidth to a frequency $f$ can be represented without loss of information by a series of sample values spaced at intervals $$T = \frac{1}{2f}$$

or less. The circuits of FIGURE 1A permit a minimum sampling rate of $$\frac{1}{T} = 2f$$

samples per second to be employed, and consequently lead to a transmitted signal of minimum bandwidth.

The information input signals for channels I, II, III, and N are applied to sampling gates 309, 310, 311, and 312 respectively. Sampling gates 309, 310, 311, and 312 may be identical in design with those used in the receiving equipment of FIGURE 1. Also applied to the sampling gates 309, 310, 311, and 312, is an impulse synchronizing signal 313, which consists of sharp impulses at the end of each transmission interval. Synchronizing signal 313 may be derived from the output of square wave oscillator 1 as described later in connection with FIGURE 11A. The information samples are held constant for the next succeeding transmission interval by memory circuits 314, 315, 316, and 317, which may be similar to those used in the receiving circuits of FIGURE 1, except that lowpass filtering is not used on the output of the memory capacitors. The sampled and stored voltages taken from memory circuits 314, 315, 316, and 317 are applied to the multiplier circuits 3, 4, 5, and 6 respectively, in lieu of the original input information signals.

One of the principal unique features of the present invention is the use of carrier waveforms which are orthogonal polynomial functions of time, or combinations thereof. Referring again to the theoretical discussion of orthogonal polynomials in A Course of Modern Analysis, E. T. Whittaker and G. N. Watson, Cambridge University Press, 4th edition reprinted 1958, pages 302–336, the first five polynomial functions which satisfy the orthogonality condition within a time duration T, are:

$$P_0(x) = 1$$
$$P_1(x) = x$$
$$P_2(x) = \frac{1}{2}(3x^2 - 1)$$
$$P_3(x) = \frac{1}{2}(5x^3 - 3x)$$
$$P_4(x) = \frac{1}{8}(35x^4 - 30x^2 + 3)$$

where $x$ is a normalized independent variable defined as:

$$x = \frac{2}{T}\left(t - \frac{T}{2}\right) \text{ for } 0 \leq t \leq T$$

Higher order orthogonal polynomials can be derived from the two immediately lower order polynomials by either of the recurrence formulae:

$$P_n(x) = (2n-1)\int_{-1}^{x} P_{n-1}(y)dy + P_{n-2}(x), \; n \geq 2$$

$$= \frac{(2n-1)}{n} x P_{n-1}(x) - \frac{(n-1)}{n} P_{n-2}(x), \; n \geq 2$$

Waveforms A, B, C, D, and E in FIGURE 2 illustrate the first five orthogonal polynomials $P_0$, $P_1$, $P_2$, $P_3$, and $P_4$ respectively. Since all of the waveforms are derived from the square wave A of FIGURE 2, they are shown with normal polarity during the time interval 0 to T, and with inverted polarity during the succeeding time interval T to 2T.

When using these orthogonal polynomial waveforms as carrier signals in a multi-channel link, multiplying factors must be applied if all carriers are to contain equal power in their fully modulated state. Equal power is desirable in order that no channel be more adversely affected by noise than any other. The power in each orthogonal polynomial waveform is proportional to:

$$\frac{1}{T}\int_0^T P_n^2(t)dt = \frac{1}{2}\int_{-1}^{1} P_n^2(x)dx = \frac{1}{2n+1}$$

Therefore each polynomial $P_n$ should be multiplied by the factor $k_n = \sqrt{2n+1}$ to achieve equal power.

Waveform F of FIGURE 2 shows the composite signal obtained when the five waveforms A, B, C, D and E are properly weighted for equal power, modulated with $+1$ information signals, and added together. It will be noted that there is a discontinuous transition in waveform F at the end of each time interval T. This characteristic transition is useful for conveying synchronizing information, but may result in an undesirably broad frequency spectrum.

Waveform G of FIGURE 2 shows an alternate composite waveform obtained by omitting the $P_0$ polynomial and allowing only the odd order polynomials to alternate in polarity from one synchronizing interval to the next. Waveform G typically exhibits a cusp at the transitions between synchronizing intervals and is more confined in frequency spectrum than waveform F.

Waveform H of FIGURE 2 shows another alternate composite waveform using difference waveforms $$P_n - P_{n-2}$$

as carrier signals. The weighting factors for equal power now become $$k_n = \sqrt{\frac{(2n-3)(2n+1)}{2(2n-1)}}$$

The cases $n=0$, 1 are omitted, and only the even order polynomials are allowed to alternate in polarity. Waveform H is continuous both in value and slope at the transitions between synchronizing intervals and is more confined in frequency spectrum than either waveform F or waveform G.

FIGURES 3A, 3B, and 3C illustrate the single-sided power spectra of the composite signals of FIGURE 2. Frequency is plotted only in the positive direction in terms of an index number, $m$ representing harmonics of the fundamental square wave synchronizing frequency, $1/2T$. If the composite signal is denoted by $E(t)$, then its component of power at the $m$th harmonic frequency is:

$$S(m) = 2\left|\frac{1}{2T}\int_0^{2T} E(t)e^{-i\frac{\pi m}{T}t}dt\right|^2$$

When this computation is performed for composite signal F of FIGURE 2, the spectrum of FIGURE 3A is obtained, in which the power in the higher harmonics decreases with frequency in proportion to $1/m^2$. Composite signal G of FIGURE 2 exhibits the spectrum of FIGURE 3B, in which power at high frequencies decreases in proportion to $1/m^4$; and composite signal H of FIGURE 2 exhibits the spectrum of FIGURE 3C, in which power of high frequencies decreases in proportion to $1/m^6$. FIGURES 3A, 3B, and 3C clearly illustrate that from the standpoint of spectrum conservation, waveform G of FIGURE 2 is preferred to waveform F of FIGURE 2, and waveform H of FIGURE 2 is preferred to either waveform F or G of FIGURE 2.

In FIGURES 3A, 3B, and 3C, a constant modulation of $+1$ has been assumed for all channels. As described earlier, a double-sideband, suppressed-carrier type of modulation is used. In the presence of time-varrying modulation, the spectra of FIGURES 3A, 3B, and 3C would no longer be simple line spectra, but instead would consist of narrow bands of power symmetrically disposed about the harmonics of the synchronizing frequency.

Although only three examples of composite waveforms and their frequency spectra are illustrated in FIGURES 2 and 3, it should be clearly understood that other sets of carrier waveforms derivable from orthogonal polynomial signals are also included within the scope of the invention. For example, any set of carriers consisting of finite sums, differences, or products of orthogonal polynomials or other schemes of systematically changing polarity or other aspects of the orthogonal polynomials from one synchronizing interval to the next, do not violate the spirit or intent of this invention.

One of several possible methods of synthesizing orthogonal polynomial waveforms is illustrated in FIGURE 4. It makes use of cascaded integrator and adder circuits in accordance with the first recurrence formula cited earlier. When time is considered as the independent variable, this recurrence formula appears as follows:

$$P_n(t) = \frac{2(2n-1)}{T} \int_0^t P_{n-1}(u) du + P_{n-2}(t), \; n \geq 2$$

Once the waveforms $P_0(t)$ and $P_1(t)$ are available, all other waveforms may be derived by repeated application of this formula.

In FIGURE 4, the square wave synchronizing signal 21 comprises the $P_0(t)$ waveform since it has a constant value of +1 during its first half cycle. During its second half cycle, the square wave 21 has a constant value of −1, and all waveforms derived from it will consequently be inverted in polarity.

The $P_1(t)$ waveform 22 is derived by means of the integrator 23, which converts the square wave 21 to a sawtooth wave 24, and the summing inverter 25, which adds the square wave 21 to the sawtooth wave 24, thereby making each half cycle of the $P_1(t)$ waveform 22 symmetrical about the zero level. The integrator 23 consists of an operational amplifier and resistor-capacitor network as commonly used in analog computer applications and described, for example, in Electronic Analog Computers, G. A. Korn and T. M. Korn, McGraw-Hill, 1952, pages 138–146. The summing inverter 25 consists of a similar operational amplifier and a resistor network as described in the same textbook at pages 12–14.

At the end of each synchronizing interval, the impulse synchronizing signal 26 operates reset switch 27, causing integrator 23 to be reset to zero potential, thereby allowing integrator 23 to operate independently from one synchronizing interval to the next. The impulse synchronizing signal 26 is derived from the square wave synchronizing signal 21 in a manner described later in connection with FIGURE 11A. Reset switch 27 may be a bi-directional diode switch as described in Pulse and Digital Circuits, J. Millman and H. Taub, McGraw-Hill, 1956, pages 438–440. A description of methods for resetting integrator 23 may be found in Electronic Analog Computers, G. A. Korn and T. M. Korn, McGraw-Hill, 1952, at pages 289–292.

In a similar manner, the $P_1(t)$ sawtooth wave 22 is converted to the parabolic wave 28 by integrator 29. The $P_2(t)$ waveform 30 is derived by means of the summing inverter 31, which adds a negative $P_0(t)$, obtained from inverter 32, to the parabolic wave 28. Inverter 32 may be identical in design to the summing inverters 25 and 31, except that only one input terminal is used. It will be noted that the operations performed by integrator 29, inverter 32, and summing inverter 31 are precisely those prescribed by the recurrence formula given above, for the case of $n=2$.

A further application of the recurrence formula yields the $P_3(t)$ waveform 33. Integrator 34 converts the $P_2(t)$ waveform to the cubic waveform 35, and inverter 36 and summing inverter 37 add the $P_1(t)$ waveform with proper polarity. A still further application of the recurrence formula yields the $P_4(t)$ waveform 38. Integrator 39 converts the $P_3(t)$ waveform to the quartic waveform 40, and inverter 41 and summing inverter 42 add the $P_2(t)$ waveform with proper polarity. Additional orthogonal polynominal waveforms may be obtained if desired by cascading additional integrators, inverters, and summing inverters identical to those shown in FIGURE 4.

The reset switches 43, 44, and 45 are provided for resetting integrators 29, 34, and 39 respectively, to the zero level at the end of each synchronizing interval. Even though the integrated waveforms 28, 35, and 40 normally pass through the zero level at the end of each synchronizing interval, resetting is beneficial in that it counteracts the harmful effects of low-frequency noise and drift in the integrators 29, 34, and 39. An identical reset switch would be provided for each additional integrator employed in synthesizing higher order polynomial waveforms.

Another type of polynomial waveform synthesizer which may be used is shown in FIGURE 5. It makes use of cascaded multiplier and summing devices in accordance with the second recurrence formula cited earlier. With time as the dependent variable, this formula can be written as follows:

$$P_n(t) = \frac{(2n-1)}{n} P_1(t) P_{n-1}(t) - \frac{(n-1)}{n} P_{n-2}(t), n \geq 2$$

In FIGURE 5, the square wave synchronizing signal 55 comprises the $P_0(t)$ waveform, and the $P_1(t)$ waveform 56 is derived therefrom by means of integrator 57 and summing inverter 59, which operate in an identical manner to that already described in connection with FIGURE 4. Integrator 57 is reset to zero potential by reset switch 58, in response to the impulse synchronizing signal 54.

The $P_1(t)$ waveform 56 is applied to multiplier 60, to which is also applied the $P_0(t)$ waveform 55. Multiplier 60 is an electronic four-quadrant multiplier of the type already described in connection with FIGURE 1. Its purpose is to rectify the alternations in polarity from one synchronizing interval to the next, of the $P_1(t)$ waveform 56, so as to produce the repetitive sawtooth waveform 61. Inverter 62 produces the inverted sawtooth waveform 63. The inverted sawtooth waveform 63 is applied to the four-quadrant multipliers 64, 65, and 66, and any other multipliers used in generating additional carriers.

Multiplier 64 forms the negative product $-P_1^2(t)$ which is applied to summing inverter 67. The $P_0(t)$ signal 55 is also applied to summing inverter 67. In the summing inverter 67, the $-P_1^2(t)$ signal is weighted by a constant factor of three halves, and the $P_0(t)$ signal is weighted by a constant factor of one half. The negative sum of these weighted signals is the $P_2(t)$ waveform 68, as may be verified by setting $n=2$ in the recurrence formula cited above.

In similar fashion, multiplier 65 produces a product signal $-P_1(t)P_2(t)$, which is combined with the $P_1(t)$ signal 56 in summing inverter 69. In summing inverter 69, weighting factors of 5/3 and 2/3 are applied to the $-P_1(t)P_2(t)$ and $P_1(t)$ signals respectively, so as to produce the $P_3(t)$ waveform 70.

Multiplier 66 is then used to produce a product signal $-P_1(t)P_3(t)$, which is weighted by 7/4 and added to the $P_2(t)$ signal 68 weighted by 3/4 in summing inverter 71, to produce the $P_4(t)$ waveform 72. Higher order polynomial waveforms are synthesized by similar arrangements of multipliers and summing inverters.

FIGURE 6 depicts still another possible design for a polynomial waveform synthesizer It employs photoelectric techniques for generating polynomial waveforms of order two and higher. A conventional cathode ray tube 78 containing an electron gun assembly 79 energized by the high voltage power supply 80, is used to produce a finely-focused electron beam 81. A high frequency oscillator 82 driving a push-pull amplifier 83 applies a rapid sawtooth deflection voltage 84 to the vertical deflection plates 85, causing the electron beam 81 to scan rapidly in a vertical direction.

At the same time, the electron beam is scanned in a horizontal direction by a low frequency sawtooth potentional applied to the horizontal deflection plates 86 by the push-pull amplifier 87. The sawtooth waveform applied to push-pull amplifier 87 is the $P_1(t)$ polynomial waveform 88. It is generated from the $P_0(t)$ square wave 89 as in FIGURES 4 and 5, by means of the integrator 90, reset switch 91, and summing inverter 92.

As the electron beam 81 strikes the phosphor screen 93, light is emitted which is either transmitted or blocked by the mask 94 depending upon the beam position. Separate apertures in the mask are shaped in accordance with each polynomial to be synthesized, horizontal displacement being portional to the independent variable $x$, and vertical height of the aperture being proportional to $P_n(x)$ plus a constant bias sufficient to avoid negative values. At each horizontal position $x$, the electron beam 81 scans rapidly in a vertical direction, the total amount of light passing through each aperture being proportional to its height.

Light shield assembly 95 and lenses 96, 97, and 98 serve to isolate and direct the light from each aperture onto the corresponding photo-electric cells 99, 100, and 101. The response time of photo-electric cells 99, 100, and 101 is made slow enough that they measure the average light intensity received over a vertical scan. Electrical output signals from photo-electric cells are applied to the A.-C. coupled amplifiers 102, 103, and 104 where the polynomial waveforms $P_2(t)$, $P_3(t)$, and $P_4(t)$ are amplified and their average level restored to zero. To automatically calibrate the gain of amplifiers 102, 103, and 104, the $P_0(t)$ square wave 89 is converted to a D.C. gain control voltage by means of rectifier 105 and memory circuit 106. Rectifier 105 passes only the positive half cycles of the square wave 89. Memory circuit 106, which is similar to those described in connection with FIGURE 1, stores the peak value of the square wave 89.

Multiplier 107 is used to multiply the output signal of amplifier 102 by the $P_0(t)$ square wave 89, to produce a $P_2(t)$ waveform 108 which alternates in polarity from one synchronizing interval to the next. Similarly, multiplier 109 multiplies the output of amplifier 104 by the $P_0(t)$ square wave 89, to produce a $P_4(t)$ waveform 110 which alternates in polarity. Any other even order polynomial would be alternated in polarity with similar multipliers. The $P_3(t)$ waveform 111 is taken directly from amplifier 103 since, like any other odd order waveform, it is generated directly with alternating polarity.

To produce the carriers needed for composite waveform F of FIGURE 2, the attachments shown in FIGURE 7A are used in conjunction with the polynomial waveform synthesizer of FIGURES 4, 5, or 6. Input terminals 117, 118, 119, 120, and 121 of FIGURE 7A are connected to output terminals 46, 47, 48, 49, and 50 respectively of FIGURE 4; or to output terminals 73, 74, 75, 76, and 77 respectively of FIGURE 5; or to output terminals 112, 113, 114, 115, and 116 respectively of FIGURE 6.

The $P_0(t)$ waveform on input terminal 117 of FIGURE 7A is available without further processing as a reference signal. The $P_1(t)$ waveform on input terminal 118 is passed through inverting amplifier 112, where it is multiplied by a fixed factor of minus $\sqrt{3}$, and inverter 123 where it is further multiplied by a fixed factor of minus one. Both the inverting amplifier 122 and the inverter 123 may consist of an operational amplifier and resistor network as described in Electronic Analog Computers, G. A. Korn and T. M. Korn, McGraw-Hill, 1952, pages 10–12.

Output signals representing $\sqrt{3}P_1(t)$ and $-\sqrt{3}P_1(t)$ are available from inverter 123 and inverting amplifier 122 respectively, for use as the carrier signal for channel I. The weighting factor of $\sqrt{3}$ assures that the channel I carrier, when fully modulated with a $+1$ information signal, will exhibit the same average power as the reference signal. The carrier signal is made available with both polarities to facilitate the four-quadrant multiplication process to be used in modulating the carrier.

In a similar manner, inverting amplifiers 124, 125, and 126; and inverters 127, 128, and 129 are used to derive carrier signals $\pm\sqrt{5}P_2(t)$, $\pm\sqrt{7}P_3(t)$, and $\pm\sqrt{9}P_4(t)$ for channels II, III, and IV respectively.

FIGURE 7B shows the attachments to be used with FIGURES 4, 5, or 6 in producing the carrier signals needed for composite signal G of FIGURE 2. Input terminals 130, 131, 132, 133, and 134 of FIGURE 7B are connected to output terminals 46, 47, 48, 49, and 50 respectively of FIGURE 4; or to output terminals 73, 74, 75, 76, and 77 respectively of FIGURE 5; or to output terminals 112, 113, 114, 115, and 116 respectively of FIGURE 6.

The $P_0(t)$ square wave appearing on terminal 130 of FIGURE 7B is applied to the electronic multipliers 135 and 136. Multiplier 135 serves as a reversing switch to rectify the alternations in polarity from one synchronizing interval to the next, of the $P_2(t)$ polynomial waveform appearing at terminal 132. Multiplier 136 performs the same function for the $P_4(t)$ polynomial waveform appearing at terminal 134. Multipliers 135 and 136 may consist, for example, of the same electronic circuits for four-quadrant multiplication described in connection with FIGURE 1. Similar multipliers are used for each even-ordered polynomial waveform.

It will be noted that when the attachments of FIGURE 7B are used with the synthesizer of FIGURE 6, the use of multipliers 135 and 136 in FIGURE 7B and multipliers 107 and 109 in FIGURE 6 is redundant, since the net result is to leave the $P_2(t)$ and $P_4(t)$ waveforms unchanged. A simpler equipment is possible in this case if multipliers 107, 109, 135, and 136 are omitted, and the output signals of amplifiers 102 and 104 in FIGURE 6 tied directly to terminals 137 and 138 respectively in FIGURE 7B.

The remainder of the attachments in FIGURE 7B are similar to those in FIGURE 7A. Inverting amplifier 139 and inverter 140 produce a reference signal of the form $\sqrt{3}P_1(t)$. In verting amplifiers 141, 142, and 143, and inverters 144, 145, and 146 produce carrier signals of the form $\pm\sqrt{5}P_2(t)$, $\pm\sqrt{7}P_3(t)$, and $\pm\sqrt{9}P_4(t)$ for channels I, II, and III respectively.

The attachments shown in FIGURE 7C are used with the synthesizer of FIGURES 4, 5, or 6 to produce the carrier signals required for composite waveform H of FIGURE 2. In this case, input terminals 147, 148, 149, 150, and 151 of FIGURE 7C are connected to output terminals 46, 47, 48, 49, and 50 respectively of FIGURE 4; or output terminals 73 74, 75, 76, and 77 respectively of FIGURE 5; or output terminals 112, 113, 114, 115, and 116 respectively of FIGURE 6.

The $P_4(t)$ waveform appearing at terminal 147 of FIGURE 7C is passed through inverter 152 and applied to the summing inverter 153. The $P_2(t)$ waveform at terminal 149 is also supplied to summing inverter 153 such that a signal of the form $$[-P_2(t)+P_0(t)]$$

is produced. In a similar manner, inverter 154 and summing inverter 155 are used to produce a signal of the form $$[-P_3(t)+P_1(t)]$$

and inverter 156 and summing inverter 157 are used to produce a signal of the form $$[-P_4(t)+P_2(t)]$$

It will be noted that when the attachments of FIGURE 7C are used with the synthesizer of FIGURE 4, a simplification of equipment is possible. Signals of the form $[-P_2(t)+P_0(t)]$, $[-P_3(t)+P_1(t)]$ and $[-P_4(t)+P_2(t)]$ are directly available at terminals 51, 52, and 53 respectively of FIGURE 4. In this case, the inverters 152, 154, and 156 and summing inverters 153, 155, and 157 of FIGURE 7C may be omitted, and the input terminals 158, 159, and 160 of FIGURE 7C may be connected directly to output terminals 51, 52, and 53 respectively of FIGURE 4.

In FIGURE 7C, the $[-P_3(t)+P_1(t)]$ waveform at terminal 159 is applied to multiplier 161, to which is also applied the $P_0(t)$ waveform at terminal 147. Multiplier 161 serves to rectify the polarity alternations of the $[-P_3(t)+P_1(t)]$ in the same way as described in connection with FIGURE 7B. Similar multiplier circuits would be used for the same purpose for each additional order polynomial waveform.

Inverting amplifier 162 is used to obtain a reference signaal of the form $$\sqrt{\tfrac{5}{6}}[P_2(t)-P_0(t)]$$

Inverting amplifiers 163 and 164, and inverters 165 and 166, are used to obtain carrier signals of the form $$\pm\sqrt{\tfrac{21}{10}}[P_3(t)-P_1(t)] \text{ and } \pm\sqrt{\tfrac{45}{14}}[P_4(t)-P_2(t)]$$

for channels I and II respectively.

After the carrier signals have been modulated and combined in the summing amplifier 7 of FIGURE 1, the composite signal for transmission, in the case of waveform F of FIGURE 2, will have the form:

$$E(t)=\sum_{n=0}^{N} a_n\sqrt{2n+1}P_n(t),\ 0\leq t\leq T$$

The coefficients $a_n$ represent the modulating information input signals, which in normalized form, are allowed to vary anywhere in the range from $-1$ to $+1$. They are assumed to be varying slowly enough that they may be considered constant during any one time interval T. Although the formula above applies only to waveform F of FIGURE 2 during the positive half-cycle of the synchronizing square wave, the modifications of the formula necessary to describe waveform F of FIGURE 2 during the negative half-cycle, as well as waveforms G and H of FIGURE 2 during both half-cycles, are readily apparent from the notations given in FIGURE 2.

At the receiving station, again for the case of waveform F of FIGURE 2, the value of each modulation coefficient $a_n$ is determined by implementation of the formula:

$$a_n=\frac{1}{T}\int_0^T \sqrt{2n+1}P_n(t)E(t)dt$$

This formula follows immediately from the orthogonality condition and the fact that each waveform $\sqrt{2n+1}P_n(t)$ has a mean-square value of unity. Thus each modulation coefficient $a_n$ can be computed by multiplying the composite signal $E(t)$ by the normalized carrier for that channel, $\sqrt{2n+1}P_n(t)$, and integrating over the time duration T.

These are the computations performed by the polynomial waveform analyzer portion of the invention. The analyzer is, as the formula for computing $a_n$ indicates, a correlation device. According to the teachings of optimum signal detection, as set forth for example in Random Signals and Noise, W. B. Davenport and W. L. Root, Mc-Graw-Hill, 1958 at pages 343–345, correlation is the process which maximizes signal-to-noise ratio. The effective noise bandwidth of a correlation device is simply $1/T$, the reciprocal of the integrating time, or in this case twice the basic synchronizing frequency. Noise uniformly distributed in frequency spectrum is therefore rejected to the maximum possible extent by the receiving portion of the invention.

FIGURE 8 shows one possible design for a polynomial waveform analyzer capable of performing the desired correlation computations. The composite signal received over the transmission link, which may have the form of either waveform F, G, or H of FIGURE 2 is applied to the amplifier 167. Amplifier 167 is a conventional linear amplifier whose gain is established by a control signal which is derived in a manner to be described later and applied to terminal 186. Amplifier 167 assures a net transmission gain of unity by compensating for any attenuation of the composite signal which might have occurred during transmission.

After passing through amplifier 167, the composite signal is applied to multipliers 168, 169, 170, 171, and 172, which may be similar circuits to those described in connection with FIGURE 1. Also applied to multipliers 168, 169, 170, 171, and 172 are the waveforms $P_0(t)$, $P_1(t)$, $P_2(t)$, $P_3(t)$, and $P_4(t)$ obtained from the polynomial waveform synthesizer 173, which may be identical with the equipment shown in either FIGURES 4, 5, or 6. Synthesizer 173 is synchronized by the square wave synchronizing signal 184 and impulse synchronizing signal 185, which are obtained at the receiver in a manner to be described later.

The product signals generated by multipliers 168, 169, 170, 171, and 172 are applied to integrators 174, 175, 176, 177, and 178, which may be identical circuits to those described in connection with FIGURE 4. At the end of each synchronizing interval, integrators 174, 175, 176, 177, and 178 are reset to the zero level by means of the impulse signal 185 and the reset switches 179, 180, 181, 182, and 183, also as described in connection with FIGURE 4.

The output signals from integrators 174, 175, 176, 177, and 178 are the correlation waveforms $\phi_0(t)$, $\phi_1(t)$, $\phi_2(t)$, $\phi_3(t)$, and $\phi_4(t)$, which are defined by the general formula:

$$\phi_n(t)=\frac{-1}{T}\int_0^t P_n(u)E(u)du$$

It can be readily seen that, for the case of waveform F of FIGURE 2, the value of each correlation waveform at the end of each synchronizing interval is proportional to the modulation coefficient for that channel; that is:

$$\phi_n(T)=-\frac{a_n}{\sqrt{2n+1}}$$

The equipment needed to derive the coefficients $a_n$ from the correlation waveforms $\phi_n(t)$, for this case as well as the cases of waveforms G and H of FIGURE 2, is described later in connection with FIGURE 10.

FIGURE 9 shows an alternate design of a polynomial waveform analyzer capable of performing the desired correlation computations. It employs cascaded integrator and summing circuits arranged to act as a multi-channel matched filter. With reference again to Random Signals and Noises, W. B. Davenport and W. L. Root, McGraw-Hill, pages 244–247, a matched filter is another means of performing correlation computations, with the same degree of noise rejection.

In FIGURE 9, the composite signal received over the transmission link, which may have the form of either waveform F, G, or H of FIGURE 2, is applied to the linear amplifier 192. As described in connection with FIGURE 8, amplifier 192 and the gain control signal applied to terminal 193 assure a net transmission gain of unity.

The amplified composite signal is applied to multiplier 194, to which is also applied the square wave synchronizing signal 195. As described in connection with FIGURES 7B and 7C, multiplier 194 serves to rectify the polarity alternations in the composite signal from one synchronizing interval to the next.

The polarity-corrected composite signal is then applied to integrator 196, which is reset at the end of each synchronizing interval by reset switch 197, in response to the impulse synchronizing signal 198. The output signal from integrator 196 is applied to the network 199, which is identical with the synthesizer equipment shown in FIGURE 4, described in detail above.

The equipment consisting of integrator 196, its reset switch 197, and the network of cascaded integrators and summing inverters 199, comprise a multi-channel matched filter. A matched filter is defined as a network whose impulse response is equal to the desired signal waveform reversed in time. It will be noted that if all integrators are initially reset to zero, an impulse applied to integrator 196 will result in output signals at terminals 200, 201, 202, 203, and 204 which are precisely the polynomial waveforms $P_0(t)$, $P_1(t)$, $P_2(t)$, $P_3(t)$, and $P_4(t)$ respectively, for the succeeding time duration T. The integrator 196 will convert an applied impulse into a unit step function at terminal 200. With a step function input, the network 199 will operate exactly the same as the polynomial waveform synthesizer of FIGURE 4.

The output signals arising when a composite signal $E(t)$ is applied to integrator 196 is predictable by means of the well-known convolution theorem:

$$\psi_n(t) = \frac{-1}{T}\int_0^t E(u)P_n(t-u)du, \; 0 \leq t \leq T$$

In this formula, $P_n(t)$ is the impulse response of the network at its $n$th output terminal, which has just been shown to be the $n$th order orthogonal polynomial waveform.

In the end of each synchronizing interval, the value of each output signal of FIGURE 9 is:

$$\psi_n(T) = \frac{-1}{T}\int_0^T E(u)P_n(T-u)du$$

Since the time-reversed polynomial waveforms $P_n(T-u)$ are unchanged if $n$ is even, and changed only in sign if $n$ is odd:

$$\psi_n(T) = (-1)^{n+1}\frac{1}{T}\int_0^T E(u)P_n(u)du$$

In the case of composite waveform F of FIGURE 2:

$$\psi_n(T) = (-1)^{n+1}\frac{a_n}{\sqrt{2n+1}}$$

The output signals $\psi_n(t)$, if sampled at the end of each synchronizing interval, are therefore proportional to the corresponding modulation coefficients $a_n$ for each interval.

FIGURE 10A shows the attachments to be used with the polynomial waveform analyzer of either FIGURE 8 or 9 when the composite signal F of FIGURE 2 is transmitted. Output terminals 187, 188, 189, 190, and 191 of FIGURE 8 are connected to input terminals 208, 209, 210, 211, and 212 respectively of FIGURE 10A; or alternatively output terminals 200, 201, 202, 203, and 204 of FIGURE 9 are connected to input terminals 208, 213, 210, 214, and 212 respectively of FIGURE 10A.

Since either the $\phi_0(t)$ or $\psi_0(t)$ correlation waveform appearing at terminal 208 is produced with negative polarity, inverter 215 is used to obtain the desired positive polarity. The output from inverter 215 is applied to sampling gate 216, where the impulse synchronizing signal 217 samples the modulation coefficient for the reference signal, $a_0 = -\phi_0(T) = -\psi_0(T)$. The sequence of values for $a_0$ is stored and filtered in memory circuit 218. Both the sampling gate 216 and memory circuit 218 may be identical with the circuits described in connection with FIGURE 1.

Since the $a_0$ coefficient had a constant value of $+1$ at the transmitter, the output signal 219 from memory circuit 218 will exhibit a constant average value representative of full-scale modulation. Output signal 219 may therefore be used as a gain control signal by connecting it either to terminal 186 of FIGURE 8 or to terminal 193 of FIGURE 9.

Inverters 220 and 221 are used to invert the polarity of the correlation waveforms $\psi_1(t)$ and $\psi_3(t)$, which are obtained in FIGURE 9 with opposite polarity from the correlation waveforms $\phi_1(t)$ and $\phi_3(t)$ obtained in FIGURE 8. Similar inverters would be used for additional odd order correlation waveforms obtained in FIGURE 9.

The inverting amplifiers 222, 223, 224, and 225 are used to apply the proper scaling factors $-\sqrt{2n+1}$ to each correlation waveform. The output signals at terminals 226, 227, 228, and 229, if sampled at the end of each synchronizing interval, will produce the molulation coefficients $a_1$, $a_2$, $a_3$ and $a_4$ respectively. Output terminals 226, 227, 228, and 229 are tied to the sampling gates of FIGURE 1 for this purpose.

The attachments of FIGURE 10B are used when composite signal G of FIGURE 2 is transmitted. In this case output terminals 187, 188, 189, 190, and 191 of FIGURE 8 are connected to input terminals 230, 231, 232, 233, and 234 respectively of FIGURE 10B; or alternatively output terminals 200, 201, 202, 203, and 204 of FIGURE 9 are connected to input terminals 230, 235, 232, 236, and 234 of FIGURE 10B.

As in FIGURE 10A, the inverters 237 and 238 of FIGURE 10B are used to invert the odd order correlation waveforms obtained from FIGURE 9; and the inverting amplifiers 239, 240, 241, and 242 are used to apply scaling factors of $-\sqrt{2n+1}$ to each correlation waveform. In addition, the multipliers 243 and 244, operating in conjunction with the square wave synchronizing signal 245, are required. Multipliers 243 and 244 serve to rectify the polarity alternations from one synchronizing interval to the next, of the correlation waveforms $\phi_2(t)$ and $\phi_4(t)$, or $\psi_2(t)$ and $\psi_4(t)$. A similar multiplier is required for each additional even order correlation waveform.

The output signals at terminals 246, 247, and 248, if sampled at the end of each synchronizing interval, will produce the modulation coefficients $a_2$, $a_3$, and $a_4$ respectively. For this purpose, terminals 246, 247, and 248 are connected to the sampling gates of FIGURE 1.

In FIGURE 10B, a gain control signal is obtained from the output signal of inverting amplifier 239. The output of inverting amplifier 239 is applied to sampling gate 249 where it is sampled by the impulse synchronizing signal 250. Sampling gate 249 may be identical in design to those described in connection with FIGURE 1. The sequence of sampled values stored and filtered by memory circuit 251 represents the modulation coefficient $$a_1 = -\sqrt{3}\overline{\phi_1(T)} = +\sqrt{3}\overline{\psi_1(T)}$$

Since $a_1$ had a constant value of $+1$ at the transmitter, the average voltage appearing at terminal 252 may be used as a gain control signal. Terminal 252 is tied either to terminal 186 of FIGURE 8 or to terminal 193 of FIGURE 9 for this purpose.

In a similar way, sampling gate 253 and memory circuit 254 may be used to obtain the average value of $\phi_0(T)$ or $\psi_0(T)$. Since the zero order polynomial $P_0(t)$ was not transmitted in this case, the average correlation $\phi_0(T)$ or $\psi_0(T)$ will be zero if the receiver is operating in proper synchronism with the composite signal received. If the receiver is not properly synchronized, the average correlation value obtained will be:

$$\phi_0(T) = \psi_0(T) = -\frac{1}{T}\int_0^T P_0(t\Delta)E(t)dt$$

If the time displacement $\Delta$ is positive, a negative correlation is obtained; and if the time displacement $\Delta$ is negative, a positive correlation is obtained. The signal appearing at terminal 255 may therefore be used as a frequency control signal as will be described later in connection with FIGURE 11.

FIGURE 10C shows the attachments to be used with FIGURE 8 or FIGURE 9 when the composite signal H of FIGURE 2 is transmitted. Output terminals 187, 188, 189, 190, and 191 of FIGURE 8 are connected to input terminals 256, 257, 258, 259, and 260 respectively of FIGURE 10C; or alternatively output terminals 201, 205, 206, and 207 of FIGURE 9 are connected to input terminals 261, 262, 263, and 264 respectively of FIGURE 10C.

The purpose of inverters 265, 266, and 267, and summing inverters 268, 269, and 270, is to produce correlation signals of the form $$[\phi_2(t) - \phi_0(t)], [\phi_3(t) - \phi_1(t)], \text{ and } [\phi_4(t) - \phi_2(t)]$$

These signals represent the correlation between the received composite signal and the carrier signals $$[P_2(t) - P_0(t)], [P_3(t) - P_1(t)], \text{ and } [P_4(t) - P_2(t)]$$

respectively.

When the polynomial waveform analyzer of FIGURE 9 is used, correlation signals of the form $$[-\psi_2(t) + \psi_0(t)], [-\psi_3(t) + \psi_1(t)]$$

and $$[-\psi_4(t) + \psi_2(t)]$$

are immediately available at terminals 205, 206, and 207 of FIGURE 9. In this case the inverters 265, 266, and 267, and summing inverters 268, 269, and 270 of FIGURE 10C may be omitted. The $$[-\psi_2(t) + \psi_0(t)]$$

signal appearing at terminal 262 of FIGURE 10C is inverted in polarity by inverter 271, and the $$[-\psi_4(t) + \psi_2(t)]$$

signal appearing at terminal 264 is inverted in polarity by inverter 272. Identical inverters would be used for additional even order correlation waveforms of FIGURE 9.

The odd order correlation waveforms, typified by the $$[\phi_3(t) - \phi_1(t)]$$

or $$[-\psi_3(t) + \psi_1(t)]$$

signal appearing at terminal 263 of FIGURE 10C, are of the correct polarity during the first half cycle of the synchronizing square wave 273, and of inverted polarity during the second half cycle. Multiplier 274, and similar multipliers for each additional odd order correlation signal, rectify the polarity alternations from one synchronizing interval to the next.

The decombiner 275 is required in this case because the reference and carrier signals $$[P_2(t) - P_0(t)], [P_3(t) - P_1(t)], \text{ and } [P_4(t) - P_2(t)]$$

are not orthogonal by themselves. If the decombiner 275 were not provided, the correlation computations at the receiver would produce the results:

$$\phi_2(T) - \phi_0(T) = \psi_2(T) - \psi_0(T) = -\sqrt{\frac{6}{5}}\left[a_2 - \sqrt{\frac{9}{84}}a_4\right]$$

$$\phi_3(T) - \phi_1(T) = -\psi_3(T) + \psi_1(T) = -\sqrt{\frac{10}{21}}[a_3]$$

$$\phi_4(T) - \phi_2(T) = \psi_4(T) - \psi_2(T) = -\sqrt{\frac{14}{45}}\left[-\sqrt{\frac{9}{94}}a_2 + a_4\right]$$

To obtain the desired modulation coefficients, the decombiner 275 makes use of the summing amplifiers 276, 277 and 278. Summing amplifiers 276, 277, and 278 may be similar in design to that described in connection with FIGURE 1. Summing amplifier 276 produces a signal of the form:

$$-\frac{28}{25}\sqrt{\frac{5}{6}}[\phi_2(t) - \phi_0(t)] - \frac{\sqrt{84}}{25}\sqrt{\frac{45}{14}}[\phi_4(t) - \phi_2(t)]$$

which if sampled at the end of each synchronizing interval, will yield the modulation coefficient $a_2$. Summing amplifier 277 produces a signal of the form:

$$-\sqrt{\frac{21}{10}}[\phi_3(t) - \phi_1(t)]$$

which when sampled will yield the modulating coefficient $a_3$. In the case illustrated, summing amplifier 277 acts only as an inverter with gain; however the addition of one more channel would require that a correlation signal $$[\phi_5(t) - \phi_3(t)]$$

be added with a suitable scale factor. Summing amplifier 278 produces a signal of the form:

$$-\frac{\sqrt{84}}{25}\sqrt{\frac{5}{6}}[\phi_2(t) - \phi_0(t)] - \frac{28}{25}\sqrt{\frac{45}{14}}[\phi_4(t) - \phi_2(t)]$$

which when sampled will yield the modulating coefficient $a_4$. In general, the decombiner derives each even order modulation coefficient by forming a linear sum of all even order correlation waveforms, and derives each odd order modulation coefficient by forming a linear sum of all odd order correlation waveforms.

A gain control signal is obtained in this case by using the impulse synchronizing signal 279 to sample the output of summing amplifier 276 in sampling gate 280. The sequence of values for the $a_2$ modulation coefficient is stored and filtered in memory circuit 281. Since $a_2$ had a constant value of $+1$ in this case, the average voltage appearing at terminal 282 may be used as a gain control signal by connecting it either to terminal 186 of FIGURE 8 or to terminal 193 of FIGURE 9.

The output signals appearing at terminals 283 and 284 of FIGURE 10C represent the correlation waveforms for channels I and II respectively, and are connected to the sampling gates of FIGURE 1 where the corresponding modulation coefficients are derived.

A frequency control signal can be derived in this case from the $\phi_1(t)$ correlation waveform appearing at terminal 257 of FIGURE 10C, or alternatively from the $\psi_1(t)$ correlation waveform at terminal 261, after its polarity is inverted by inverter 285. The sampling gate 286, operating in response to the impulse synchronizing signal 279, and the memory circuit 287 are used to derive the correlation value $\phi_1(T)$ or $-\psi_1(T)$. When the receiver is properly synchronized an average result of zero will be obtained at terminal 288. If there is a positive time displacement of the receiver synchronizing signals relative to the composite signal received, a negative signal will appear at terminal 288; and if there is a negative time displacement, a positive signal will appear at terminal 288.

To assure that the receiver is operating in exact synchronism with the composite signal transmitted, the automatic synchronizer shown in FIGURE 11A may be used. A square wave oscillator 289 is provided, which may be an astable multivibrator similar to that used at the transmitter. The square wave oscillator 289 produces the square wave synchronizing signal 290 which is required in the receiving equipment. In addition the square wave synchronizing signal 290 is passed through the differentiator 291, which may be a passive resistor-capacitor circuit, to produce the waveform 292 which consists of impulses alternating in polarity. The waveform 292, as well as its inverse obtained from inverter 293, is applied to the full-wave rectifier 294. Full wave rectifier 294, which may be a passive diode-resistor circuit, produces the impulse synchronizing signal 295 which is also required in the receiving equipment.

The frequency of the square wave oscillator 289 is varied by means of the frequency modulator 296 in response to a frequency control signal 297. Frequency modulator 296 may consist, for example, of a D.C. amplifier which varies the grid bias voltage of the astable multivibrator comprising the square wave oscillator 289. The frequency modulator 296 is designed so that a positive voltage at terminal 297 decreases the frequency of square wave oscillator 289, and a negative voltage at terminal 297 increases the frequency.

For the case in which composite signal F of FIGURE 2 is transmitted, a suitable frequency control signal may be generated by the circuits shown in FIGURE 11B. The composite signal 298 is passed through the differentiator 299, which may be a passive resistor-capacitor circuit. The differentiated signal 300 exhibits sharp positive spikes at the beginning of each positive half-cycle. Those spikes which exceed a predetermined threshold amplitude 301 are detected by the threshold detector 302, which may consist of a biased-diode circuit.

The transition pulses 303 obtained from the threshold detector 302 are applied to the sampling gate 304, where they are used to sample the receiver square wave synchronizing signal 305. Memory circuit 306 stores and filters the voltage samples obtained from sampling gate 304.

If the receiver square wave 305 exhibits a positive time displacement from its correct position, the average voltage appearing at terminal 307 will be negative; and if the receiver square wave 305 exhibits a negative time displacement, the average voltage at terminal 307 will be positive. The signal at terminal 307 may therefore be used for frequency control by connecting it to terminal 297 of FIGURE 11A. The receiver square wave frequency will consequently be adjusted automatically until it reaches a stable position where the transition pulses 303 coincide with the positive-going edges 308 of the receiver square wave 305.

Automatic frequency control may be achieved in a similar manner when composite signal G or H of FIGURE 2 is transmitted. When composite signal G of FIGURE 2 is transmitted, a suitable frequency control signal is available at terminal 255 of FIGURE 10B, as already described in connection with that figure. When composite signal H of FIGURE 2 is transmitted, a suitable frequency control signal is available at terminal 288 of FIGURE 10C.

It will be realized that the foregoing description is intended to be illustrative only, and is not to be taken in any way as limiting the scope of the present invention, which is defined solely by the appended claims.

We claim:
1. A multiplex channel intelligence communication system comprising in combination:
   (a) a transmitting station and a remotely located receiving station with a communication link therebetween,
   (b) means at said transmitting station for generating square wave oscillations of a fundamental frequency and deriving therefrom a plurality of waveforms bearing a mutually orthogonal polynomial relation to each other and at different power levels,
   (c) means for amplifying said different waveforms individually to bring them to a substantially uniform power level,
   (d) means for controlling selected waveforms by said square wave oscillations to alternate the polarity of said selected wave forms from one transmission interval to the next one to attain a narrower frequency spectrum,
   (e) input circuits for intelligence signals,
   (f) means for modulating said waveforms with said intelligence signals,
   (g) means for combining said modulated waveforms for transmission along said communication link,
   (h) means at said receiving station for deriving synchronizing signals from the combined energy received at said receiving station,
   (i) means at said receiving station for compensating for said alternations of polarity,
   (j) means for correlating the composite signal with the polynomial waveform for each channel,
   (k) means for sampling the correlation waveform in each channel, and
   (l) means for smoothing each sampled correlation waveform to derive the original intelligence signals therefrom.

2. A multiplex channel intelligence communication system comprising in combination:
   (a) a transmitting station and a remotely located receiving station with a communication link therebetween,
   (b) means at said transmitting station for generating a plurality of waveforms bearing a mutually orthogonal polynomial relation to each other,
   (c) input circuits for intelligence signals,
   (d) means for modulating said waveforms with said intelligence signals,
   (e) means for combining said modulated waveforms for transmission along said communication link;
   (f) means at said receiving station for deriving synchronizing signals from the combined energy received at said receiving station,
   (g) means at said receiving station for generating a plurality of waveforms corresponding to those generated at the transmitting station;
   (h) means for multiplying the individual polynomial waveforms by the received composite signal;
   (i) means for integrating each resulting product during each transmission interval to obtain a set of correlation waveforms,
   (j) means for sampling the correlation waveform in each channel,
   (k) means for smoothing each sampled correlation waveform to derive the original intelligence signals therefrom, and
   (l) means for re-setting the integrating means in each channel at the end of each transmission interval.

3. A multiplex channel intelligence communication system comprising in combination:
   (a) a transmitting station and a remotely located receiving station with a communication link therebetween,
   (b) means at said transmitting station for generating square wave oscillations of a fundamental frequency and deriving therefrom a plurality of waveforms bearing a mutually orthogonal polynomial relation to each other,
   (s) input circuits for intelligence signals,
   (d) means for modulating said waveforms with said intelligence signals,
   (e) means for transmitting one waveform free of any modulation to function as a reference waveform,
   (f) means for combining said modulated waveforms and reference waveform for transmission along said communication link,
   (g) means at said receiving station for deriving synchronizing signals from the reference waveform component of the combined energy received at said receiving station,
   (h) means for generating square wave oscillations of substantially the same fundamental frequency and phase as those generated at the transmitting station,
   (i) means for controlling said last-mentioned oscillations by said synchronizing signals to enforce identity of their frequency and phase with those of the oscillations at the transmitting station,
   (j) means for correlating the composite signal with the polynomial waveform for each channel,
   (k) means for sampling the correlation waveform in each channel, (l) means for smoothing each sampled correlation waveform to derive the original intelligence signals therefrom, and (m) means for adapting the sampled and smoothed correlation reference waveform to calibrate the remaining waveforms bearing the intelligence signals.

4. The method of multiple channel intelligence communication which comprises generating a plurality of waveforms bearing a mutually orthogonal polynomial relation to each other, amplitude modulating said waveforms with a plurality of intelligence signals, combining said modulated waveforms for transmission, receiving said combined modulated waveforms, deriving a synchronizing signal therefrom, correlating the composite signal with the orthogonal polynomial waveform for each channel, sampling the correlation waveform in each channel, and smoothing the sampled correlation waveform in each channel for derivation of the original intelligence signals for utilization.

5. A multiplex channel intelligence communication system comprising in combination:
(a) a transmitting station and a remotely located receiving station with a communication link therebetween,
(b) means at said transmitting station for generating a synchronizing signal of a fundamental frequency and deriving therefrom a plurality of waveforms bearing a mutually orthogonal polynomial relation to each other,
(c) input circuits for intelligence signals,
(d) means for modulating said waveforms with said intelligence signals,
(e) means for adding together said modulated waveforms for transmission along said communication link,
(f) means at said receiving station for generating a synchronizing signal of substantially the same fundamental frequency and phase as that generated at the transmitting station,
(g) means for controlling the synchronizing signal at the receiving station to enforce identity of its frequency and phase with that of the synchronizing signal at the transmitting station,
(h) means for correlating the composite signal with the polynomial waveform for each channel,
(i) means for sampling the correlation waveform in each channel, and
(j) means for smoothing each sampled correlation waveform to derive the original intelligence signals therefrom.

6. A system as set forth in claim 5 wherein said input circuits for intelligence signals include means for rendering constant said intelligence signals during each transmission interval defined by each cycle of said fundamental frequency.

7. A system as set forth in claim 5 wherein said means at the transmitting station for generating the plurality of waveforms comprises a plurality of stages of cascaded integrators, inverters and summing inverters, the first two waveform stages being basic and comprising means for transmitting a reference voltage and connections therefrom including an integrator and a summing inverter for deriving from said reference voltage a symmetrical saw-tooth waveform, the cascaded integrators, inverters and summing inverters beyond said first two basic waveform stages being adapted to integrate the preceding waveform with a predetermined scale factor and to add thereto the output of the next preceding waveform, and means for resetting said integrators in response to the synchronizing signal.

8. A system as set forth in claim 5 wherein said means at the transmitting station for generating the plurality of waveforms comprises a plurality of stages of cascaded multipliers and inverters beyond the first two stages, the first two waveform stages being basic and comprising means for transmitting a reference voltage and connections therefrom including an integrator and a summing inverter for deriving from said reference voltage a symmetrical saw-tooth waveform, and the cascaded multipliers and inverters beyond the first two basic waveform stages each being adapted to multiply the saw-tooth waveform of the second stage by the waveform of the preceding stage with a predetermined scale factor, and subtracting from the resultant product the waveform of the next preceding stage also with a predetermined scale factor.

9. A multiplex channel intelligence communication system comprising in combination:
(a) a transmitting station and a remotely located receiving station with a communication link therebetween,
(b) means at said transmitting station for generating a plurality of waveforms bearing a mutually orthogonal polynomial relation to each other,
(c) input circuits for intelligence signals,
(d) means for modulating said waveforms with said intelligence signals,
(e) means for combining said modulated waveforms for transmission along said communication link,
(f) means at said receiving station for deriving synchronizing signals from the combined energy received at said receiving station,
(g) a matched filter network provided with multiple outputs for correlating the composite signal with the polynomial waveform for each channel, said matched filter network exhibiting an impulse response at each output terminal corresponding to the polynomial waveform of the respective channel, the first stage of the filter network consisting of an integrator, the second stage thereof consisting of an integrator, inverter and summing inverter adapted to integrate the output signal from the first stage with a predetermined scale factor and to subtract therefrom the output signal of the first stage, and each successive stage comprising an integrator, summing inverter and inverter adapted to integrate the output of the preceding stage with a predetermined scale factor and to add thereto the output of the next preceding stage, and means for re-setting the integrators at the end of each transmission interval,
(h) means for sampling the correlation waveform in each channel, and
(i) means for smoothing each sampled correlation waveform to derive the original intelligence signals therefrom.

References Cited by the Examiner
UNITED STATES PATENTS

| | | | | |
|---|---|---|---|---|
| 3,025,350 | 3/62 | Lindner | | 179—1.5 |
| 3,036,157 | 5/62 | Franco et al. | | 178—67 |

DAVID G. REDINBAUGH, *Primary Examiner.*

UNITED STATES PATENT OFFICE
CERTIFICATE OF CORRECTION

Patent No. 3,204,034　　　　　　　　　　　　　　August 31, 1965

Arthur H. Ballard et al.

It is hereby certified that error appears in the above numbered patent requiring correction and that the said Letters Patent should read as corrected below.

Column 2, line 24, for "or" read -- of --; column 9, line 74, the square root sign, each occurrence, should cover the numeral "3" only; column 10, line 10, the square root sign, each occurrence, should cover respectively, the numerals "5", "7" and "9" only; line 45, the square root sign should cover the numeral "3" only; same column 10, line 47, the square root sign, each occurrence, should cover respectively, the numerals "5", "7" and "9" only; column 14, line 33, the square root sign should cover the entire factor "2n+1"; line 55, the square root sign, each occurrence, should cover the numeral "3" only; line 65, after "correlation" insert -- valve --; same column 14, lines 70 to 72, for that portion of the formula reading "(tΔ)" read -- (t-Δ) --.

Signed and sealed this 20th day of September 1966.

(SEAL)
Attest:

ERNEST W. SWIDER　　　　　　　　　　　　　　　EDWARD J. BRENNER
Attesting Officer　　　　　　　　　　　　　　Commissioner of Patents

UNITED STATES PATENT OFFICE
CERTIFICATE OF CORRECTION

Patent No. 3,204,034                          August 31, 1965

Arthur H. Ballard et al.

It is hereby certified that error appears in the above numbered patent requiring correction and that the said Letters Patent should read as corrected below.

Column 2, line 24, for "or" read -- of --; column 9, line 74, the square root sign, each occurrence, should cover the numeral "3" only; column 10, line 10, the square root sign, each occurrence, should cover respectively, the numerals "5", "7" and "9" only; line 45, the square root sign should cover the numeral "3" only; same column 10, line 47, the square root sign, each occurrence, should cover respectively, the numerals "5", "7" and "9" only; column 14, line 33, the square root sign should cover the entire factor "2n+1"; line 55, the square root sign, each occurrence, should cover the numeral "3" only; line 65, after "correlation" insert -- valve --; same column 14, lines 70 to 72, for that portion of the formula reading "(t∆)" read -- (t-∆) --.

Signed and sealed this 20th day of September 1966.

(SEAL)
Attest:

ERNEST W. SWIDER                          EDWARD J. BRENNER
Attesting Officer                        Commissioner of Patents